United States Patent
Speidel et al.

(10) Patent No.: US 12,225,559 B2
(45) Date of Patent: Feb. 11, 2025

(54) MESSAGING FROM AN ORBITAL BASE STATION TO CELLULAR USER EQUIPMENT APPLICATIONS WITH MESSAGE PROCESSING VIA A CARD OPERATING SYSTEM

(71) Applicant: Lynk Global, Inc., Falls Church, VA (US)

(72) Inventors: Tyghe Robert Speidel, Washington, DC (US); Zheng Liu, Falls Church, VA (US); Mahmoud Khafagy, Fairfax, VA (US); Martin Harris, Falls Church, VA (US)

(73) Assignee: Lynk Global, Inc., Falls Church, VA (US)

( * ) Notice: Subject to any disclaimer, the term of this patent is extended or adjusted under 35 U.S.C. 154(b) by 0 days.

(21) Appl. No.: 18/474,067

(22) Filed: Sep. 25, 2023

(65) Prior Publication Data

US 2024/0089998 A1   Mar. 14, 2024

Related U.S. Application Data

(63) Continuation of application No. 17/322,826, filed on May 17, 2021, now Pat. No. 11,800,539.
(Continued)

(51) Int. Cl.
*H04W 4/00* (2018.01)
*H04B 7/185* (2006.01)
(Continued)

(52) U.S. Cl.
CPC ........ *H04W 72/30* (2023.01); *H04B 7/18523* (2013.01); *H04L 5/0044* (2013.01); *H04W 12/73* (2021.01)

(58) Field of Classification Search
CPC ... H04B 7/18523; H04W 12/69; H04W 72/30
See application file for complete search history.

(56) References Cited

U.S. PATENT DOCUMENTS 8,028,332 B2   9/2011   Le Buhan
8,509,727 B2   8/2013   Medford et al.
(Continued)

FOREIGN PATENT DOCUMENTS

CA   2725459 A1   12/2009
CN   101361393 A   2/2009
(Continued)

OTHER PUBLICATIONS

International Search Report for PCT Application No. PCT/US2021/032948, mailed on Sep. 8, 2021, pp. 1-2.
(Continued)

*Primary Examiner* — Shantell L Heiber
(74) *Attorney, Agent, or Firm* — Haynes and Boone, LLP

(57) ABSTRACT

An electronic user device includes inclusion list storage with electronically readable memory, for storing an inclusion list and the inclusion list indicating included logical IDs. The device also has a security module app that receives a cellular broadcast message and extracts logical IDs therefrom. This processes a targeted cellular broadcast message embedded in the payload of the cellular broadcast message, based on whether a logical ID, also embedded in the payload, of the targeted cellular broadcast message is on the inclusion list. It then formats it for consumption by an electronic user device app that receives data via a data channel when available.

26 Claims, 19 Drawing Sheets

Related U.S. Application Data

(60) Provisional application No. 63/026,288, filed on May 18, 2020.

(51) Int. Cl.
  H04L 5/00 (2006.01)
  H04W 12/73 (2021.01)
  H04W 72/30 (2023.01)

(56) References Cited

U.S. PATENT DOCUMENTS

| | | | |
|---|---|---|---|
| 8,548,419 B1* | 10/2013 | Sennett | H04W 4/90 |
| | | | 455/404.1 |
| 8,666,358 B2 | 3/2014 | Qu et al. | |
| 10,326,517 B2 | 6/2019 | Seo | |
| 10,652,721 B1 | 5/2020 | Daly et al. | |
| 2004/0125015 A1* | 7/2004 | King | G01S 5/0221 |
| | | | 342/357.69 |
| 2006/0040639 A1 | 2/2006 | Karl et al. | |
| 2007/0202886 A1 | 8/2007 | Dhebri et al. | |
| 2009/0305699 A1 | 12/2009 | Deshpande et al. | |
| 2011/0231649 A1 | 9/2011 | Bollay et al. | |
| 2011/0249658 A1 | 10/2011 | Wohlert et al. | |
| 2013/0083717 A1 | 4/2013 | Vos et al. | |
| 2013/0095838 A1 | 4/2013 | Uemura et al. | |
| 2013/0115872 A1 | 5/2013 | Huang | |
| 2013/0214909 A1 | 8/2013 | Meijers et al. | |
| 2013/0281047 A1 | 10/2013 | Daly et al. | |
| 2013/0322438 A1 | 12/2013 | Gospodarek et al. | |
| 2014/0011505 A1 | 1/2014 | Liao | |
| 2015/0365789 A1 | 12/2015 | Salot | |
| 2016/0014693 A1* | 1/2016 | Patil | H04W 72/30 |
| | | | 370/254 |
| 2016/0269765 A1 | 9/2016 | Mandyam | |
| 2017/0244469 A1 | 8/2017 | Seo et al. | |
| 2019/0372693 A1 | 12/2019 | Kodaypak et al. | |
| 2021/0235264 A1* | 7/2021 | Kolekar | H04W 12/04 |
| 2021/0329438 A1* | 10/2021 | Brooks | H04W 4/90 |

FOREIGN PATENT DOCUMENTS

| | | |
|---|---|---|
| CN | 102572719 A | 7/2012 |
| CN | 102918789 A | 2/2013 |
| CN | 103703764 A | 4/2014 |
| CN | 103907312 A | 7/2014 |
| CN | 106464928 A | 2/2017 |
| WO | 03001772 A2 | 1/2003 |
| WO | 2014009401 A2 | 1/2014 |
| WO | 2019029511 A1 | 2/2019 |
| WO | 2020051508 A1 | 3/2020 |

OTHER PUBLICATIONS

Sidorov, "Evaluation and Analysis of GPS, EGNOS and UTC Timescale Connections", Luleå University of Technology, 2009, pp. 1-32.

Supplementary European Search Report and European Search Opinion for EPO Application EP 21 808 686.6, mailed Jul. 6, 2024, 8 pages.

* cited by examiner wwn09e00718wn01h01712c
n15c00325N180d12W104d4
5159743121zzzzzzzzzzzz
zzzzzzzzzzzzzzzzzzzzzz Example of a TCBM that
includes weather forecast

| Doppler Offset Block | Doppler Shift Strip | Channel Blocks and Pseudo Distance Ranges | | | | | | |
|---|---|---|---|---|---|---|---|---|
| | | $b_0$ $r_0$ (< 534 km) | $b_1$ $r_1$ (534 to 569 km) | $b_2$ $r_2$ (569 to 603 km) | $b_3$ $r_3$ (603 to 638 km) | $b_4$ $r_4$ (638 to 672 km) | $b_5$ $r_5$ (672 to 707 km) | $b_6$ $r_6$ (> 707 km) |
| $D_{13}$ | > 30 kHz | | | | | | | 70 |
| $D_{12}$ | 25 to 30 kHz | | | | | 69 | 68 | 67 |
| $D_{11}$ | 20 to 25 kHz | | | | 66 | 65 | 64 | 63 |
| $D_{10}$ | 15 to 20 kHz | | 62 | 61 | 60 | 59 | 58 | 57 |
| $D_9$ | 10 to 15 kHz | 56 | 55 | 54 | 53 | 52 | 51 | 50 |
| $D_8$ | 5 to 10 kHz | 49 | 48 | 47 | 46 | 45 | 44 | 43 |
| $D_7$ | 0 to 5 kHz | 42 | 41 | 40 | 39 | 38 | 37 | 36 |
| $D_6$ | -5 to 0 kHz | 35 | 34 | 33 | 32 | 31 | 30 | 29 |
| $D_5$ | -10 to -5 kHz | 28 | 27 | 26 | 25 | 24 | 23 | 22 |
| $D_4$ | -15 to -10 kHz | 21 | 20 | 19 | 18 | 17 | 16 | 15 |
| $D_3$ | -20 to -15 kHz | | 14 | 13 | 12 | 11 | 10 | 9 |
| $D_2$ | -25 to -20 kHz | | | | 8 | 7 | 6 | 5 |
| $D_1$ | -30 to -25 kHz | | | | | 4 | 3 | 2 |
| $D_0$ | < -30 kHz | | | | | | | 1 |

FIG. 15

MESSAGING FROM AN ORBITAL BASE STATION TO CELLULAR USER EQUIPMENT APPLICATIONS WITH MESSAGE PROCESSING VIA A CARD OPERATING SYSTEM

CROSS-REFERENCES TO PRIORITY AND RELATED APPLICATIONS

This application claims priority from and is a continuation of U.S. Non-Provisional patent application Ser. No. 17/322,826 filed May 17, 2021, which in turn claims priority to U.S. Provisional Patent Application No. 63/026,288 filed May 18, 2020, entitled "Method for One-way Messaging using Cellular broadcast."

The following applications may be referenced herein:
1) U.S. Non-provisional patent application Ser. No. 15/857,073, filed Dec. 28, 2017, entitled "Method and Apparatus for Handling Communications between Spacecraft Operating in an Orbital Environment and Terrestrial Telecommunications Devices That Use Terrestrial Base Station Communications" (hereinafter "Speidel I");
2) U.S. Provisional Patent Application No. 62/465,945, filed Mar. 2, 2017, entitled "Method for Low-Cost and Low-Complexity Inter-Satellite Link Communications within a Satellite Constellation Network for Near Real-Time, Continuous, and Global Connectivity" (hereinafter "Speidel II"); and
3) U.S. Provisional Patent Application No. 62/490,298 filed Apr. 26, 2017, entitled "Method for Communications between Base Stations Operating in an Orbital Environment and Ground-Based Telecommunications Devices" (hereinafter "Speidel III"); and
4) PCT Patent Application No. PCT/US2019/050030 filed Sep. 6, 2019, entitled "Cellular Core Network and Radio Access Network Infrastructure and Management in Space" (hereinafter "Speidel IV").

The entire disclosures of applications/patents recited above are hereby incorporated by reference, as if set forth in full in this document, for all purposes.

FIELD

The present disclosure generally relates to broadcast messaging, from orbital platforms and/or terrestrial platforms, to cellular user equipment applications, and more particularly, to processing broadcast messaging through a smart card runtime environment as might be implemented using a subscriber identity module (SIM) card.

BACKGROUND

Mobile communication involves signals being sent between user equipment (UE) and a transceiver that can provide an interface for the UE to communicate to and from other network resources, such as telecommunication networks, the Internet, and the like, to carry voice and data communications, possibly also location-finding features. The transceiver might be a component in a base transceiver station (BTS) that handles traffic from multiple transceivers. The BTS might also include antennas and encryption/decryption elements. The antennas might be selective antennas, wherein different UEs at different locations might communicate to their respective transceivers via different antennas of the BTS. The BTS may have a wired, wireless, and/or optical channel to communicate with those other network resources. A BTS might support one or more transceivers and a given base station for supporting mobile communication might have a base station controller (BSC) that controls one or more BTS of that base station.

Examples of mobile stations include mobile phones, cellular phones, smartphones, and other devices equipped to communicate with a particular BTS. While herein the mobile stations, or UE more generally, are referred to by that name, it should be understood that an operation, function or characteristic of a mobile station might also be that of a station that is effectively or functionally a mobile station but is not at present mobile. In some examples, the mobile station might be considered instead a portable station that can be moved from place to place but in operation is stationary, such as a laptop computer with several connected peripherals and having a cellular connection, or the mobile station might be stationary, such as a cellular device that is embedded in a mounted home security system. All that is required is that the mobile station be able to, or be configured to, communicate using a mobile communication infrastructure.

UEs that receive communications over a cellular telecommunications network or an orbital telecommunications network, such as an orbital telecommunications network having orbital base stations that may appear to a UE as terrestrial base stations, can receive communications over such networks and often can also transmit as well. Communications might be done according to some agreed-upon protocol, such as 3GPP, GSM, LTE, 5G, etc.

A UE might identify and register itself to a telecommunications network using a unique identifier that would allow the telecommunications network to distribute a message to one specific UE based on the unique identifier. A telecommunications network might also be configured to send the broadcast messages to selected base stations for those selected base stations to forward a broadcast message to all UEs registered with those selected base stations. This can at times be underinclusive and/or overinclusive.

A UE might incorporate a subscriber identity module (SIM) card that runs a card operating system to perform secured operations, such as cryptographic operations, as well as for operations to identify and register the host UE with a carrier network. A SIM card might have an ability to hook into host UE events and operations, such as hooking into an event wherein the host UE initiates a voice call, a short message service (SMS) session, or a data session and the SIM card performs some operation whenever the host UE initiates a voice call, an SMS session, or a data session to check whether the owner of the UE has a valid carrier account. A host UE might have a hook for broadcast messages that are received by the UE host and thus perform some process when a broadcast message is received such as displaying the broadcast message on a UE display.

A SIM card can provide a secure, tamper-resistant environment for the cryptographic keys that mobile network operators (MNO) use to authenticate individual subscribers to the network connection and track those subscribers' activities once they are on the network. In a typical configuration, a UE host device includes a SIM interface, such as a slot with electrical connectors, to the UE host so that when the SIM card is inserted into the UE host device, the UE host can communicate with the SIM card, including a UE host processor sending data to the SIM card, having the SIM card execute programs in its secure environment, and receive data from the SIM card. The programming of the SIM card might include the ability to hook into UE programming so that when certain events are triggered, the SIM card is notified.

The interaction between the host UE and its SIM card might be programmed using a SIM Application Toolkit (SAT) that provides the SIM card with programmable interface for interacting with the UE based on software that runs on the SIM card. Thus, the SIM card could execute program code provided to it either over the air or programmed onto it during or after its fabrication to support functionality in addition to handling user and network communications security. Alternatively, in one embodiment the software might be provided by an application, or applications, on the UE host directly. With a UE so programmed, the UE might provide code for the SIM card to run in the SIM card's secure environment, interfacing with internal resources on the SIM card and resources of the host UE. Capabilities of the SAT might be defined by protocols and standards, such as the 3GPP TS 11.14 standard and the 3GPP TS 31.111 standard.

A SIM card might be configured and distributed by an MNO with their cryptographic keys and any SIM applications pre-configured for distribution through their point-of-sale (POS) channels. A SIM card might be included with a UE device at the POS.

Some UEs can handle voice calls, data traffic, and messaging. One example of a messaging system is the SMS system used by many telecommunications networks. In the case of SMS messaging, a sender could be a subscriber using their own UE or could be a network operator or an agent thereof. In various telecommunications protocols, an SMS message might have a sender, a destination user identifier of a destination UE, such as a telephone number, and a message body. Where a telecommunications network is aware of the base station with which the destination UE has registered, and SMS message can be routed through the telecommunications network to that base station and transmitted to the destination UE. The telecommunications network might have to maintain databases of which UEs are registered where, in order to route the SMS messages appropriately. The telecommunications network might simultaneously handle a large number of individually-addressed SMS messages. SMS messages might relate to personal communications, natural disasters, public safety alerts, network operator information, and other purposes.

Sending alerts using the SMS may use the telecommunication networks' control channels otherwise used for setting up voice calls and may cause network congestion. As a result, SMS alerts might not be received by the UE users in a timely manner.

Another approach to messaging is cellular broadcasting. With a cellular broadcast message, a telecommunications network operator might prepare a message to stand or obtain instructions to send a message from a third party, determine a set of base stations to receive the cellular broadcast message, send the cellular broadcast message to those base stations and then those base stations would transmit the cellular broadcast message to each UE registered at that base station. When used for natural disasters and emergency situations such as flood warnings, tsunamis, etc., the cellular broadcast message might be received by just the right set of UE if the situation is a local to an area that can be identified by base station location and all interested UEs are registered with those base stations. Problems might arise as to over-inclusion and underinclusion, such as where UEs that are in an area affected by an emergency situation but do not happen to be registered with the applicable base station.

Where a UE is not within range of a terrestrial base station, it might receive messages via an orbital base station that is configured to appear to be, to a conventional UE, a terrestrial base station. Examples are illustrated in, for example, Speidel I.

A more selective and/or more inclusive messaging approach might be desired, to reach a set of target UEs more readily and/or more efficiently.

SUMMARY

An electronic user device comprises an inclusion list storage, comprising electronically readable memory (inclusion list storage), the inclusion list indicating included logical IDs, and a security module app that receives a cellular broadcast message and extracts logical IDs therefrom. The security module app processes a targeted payload contained within a cellular broadcast message based on whether a logical ID, embedded in the cell broadcast message, is on the inclusion list and formats it for consumption by an electronic user device app that receives data via an available data channel.

A non-transitory computer-readable storage medium storing instructions, which when executed by at least one processor of a computer system, might cause the computer system to implement the above elements.

A carrier medium might carry data that includes logical IDs generated according to the methods herein and that can be used for providing apps with data received over a one-way link based on logical IDs.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the surface computation method, as defined in the claims, is provided in the following written description of various embodiments of the disclosure and illustrated in the accompanying drawings.

BRIEF DESCRIPTION OF THE DRAWINGS

Various embodiments in accordance with the present disclosure will be described with reference to the drawings, in which:

FIG. 15 illustrates an example assignment of the range ring/Doppler shift cells of FIG. 14 to particular carrier frequencies and Doppler offset blocks.

DETAILED DESCRIPTION

Figure 1:
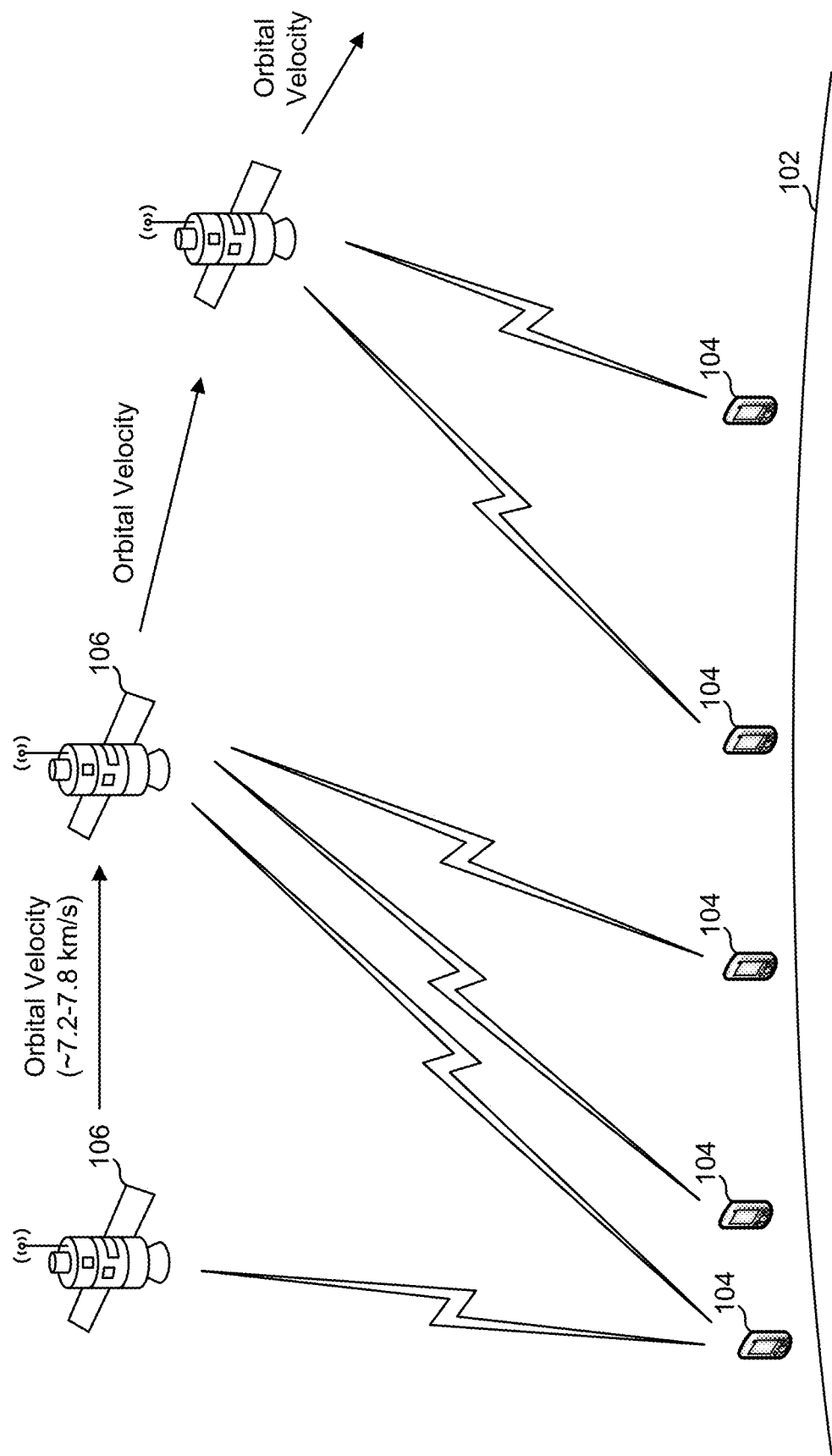
FIG. 1 illustrates a telecommunications network involving orbital base stations and terrestrial user equipment (UE), according to an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

A UE might be configured to receive messages via a telecommunications network. For example, a cellular telephone might be configured to receive SMS messages wherein an SMS message is directed to a particular telephone number or a particular subscriber identity module (also referred to as a "subscriber identification module" or "SIM card") which the telecommunications network can route through to a specific UE if registered with the network. A cellular telephone might be configured to receive cellular broadcast messages. The various configurations might be as specified by some telecommunications protocol, such as 3GPP, GSM, CDMA, LTE, 2G, 3G, 4G, 5G, etc. and future-developed protocols or generations of the above. Cellular broadcast message formats and protocols might be implemented consistent with one or more of those protocols. For example, WEA3.0 is a protocol that can be used for sending geo-targeted CB messages and when implemented, that protocol could be used.

A UE might have a capability of executing UE applications (apps) that have communications capabilities. For example, a phone app might be able to connect to a TCP/IP stack to send and receive data when the phone is in range of a cell tower and is able to set up a data channel with the cell tower. Such apps might have functionality that operates independent of communications capabilities and thus might have some operations that can be performed without external communication and other operations that require external communication.

The cellular telephone might be configured to handle SMS messages in one way, such as displaying a notification on a cellular telephone display and emitting a tone specific to SMS messaging, and handle cellular broadcast messages in another way, such as displaying the message in some manner and emitting a tone, such as a warning sound, upon receipt and processing of the cellular broadcast message. In some protocols, a maximum length of a cellular broadcast message is 1395 characters, comprising pages of up to 93 alphanumeric characters and up to 15 pages per message. In other protocols, larger page sizes or pages per message might be allowed. In sending a cellular broadcast message, a telecommunications network operator or a server originating the cellular broadcast message might select a set of base stations, such as cell towers, to receive the cellular broadcast message. The selection of cell towers might be based on covering an area impacted by an emergency, then sending alert messages to every active and registered mobile phone handset within that area.

Cellular broadcast messages might be sent on different channels other than the channels used for voice and SMS communications and as such might not contribute to network congestion for voice and SMS communications, whereas sending alerts using the SMS approach might cause network congestion, as might happen if individual SMS messages are created for each recipient UE and as a result the SMS alerts may not be received by the mobile phone users in a timely manner. A cellular broadcast alert might get delivered to mobile phone users within a few seconds. Furthermore, cellular broadcasts can be sent out without requiring each receiving device to register with the network over which messages are sent out, as is typically the case for SMS messages. With a cellular broadcast approach, only a single message need be created and broadcast, such that any UE listening on the network can receive the CB and process it.

Sending alerts using SMS messaging typically requires the mobile devices to be registered to the mobile network so that the mobile network is aware of which base stations to use in communicating with a specific mobile device. Cellular broadcasting does not require mobile devices to register to the mobile network, which enables it to reach further than a typical SMS channel.

A cellular broadcast message might be sent from a mobile networks' core network with an identifier, or a "message ID". Mobile phone users can make configuration changes on their handsets (e.g., their UE) to indicate which alert messages to display and those configurations might select among different IDs, so that one user might receive messages sent with one message ID and another user might not. Some handsets are pre-allocated for receiving certain message IDs for cellular broadcast. These message IDs may include those allocated for hurricane, tornado, or flood warnings. Some message IDs are allocated for lost or kidnapped children (e.g., AMBER alerts), and others are allocated for large scale government messaging to nationwide populations (e.g., Presidential alerts). A telecommunications network might maintain a list of a large number of message IDs that can be utilized in the cellular broadcast channel and various providers might agree on certain standards for message IDs. For example, there might be thousands of possible message IDs, but only a hundred or so allocated for certain cellular broadcast content. In some networks and agreements among networks, for example, message ID 4352 is for earthquake warnings, 4353 is for tsunami warnings, and 4370 is for Presidential alerts. Some message IDs, such as message IDs 0 to 999, might not be allocated for any cellular broadcast content.

It can be useful to have messages directed to single UEs, a group of UEs, or perhaps UEs in a particular geographic location whether registered or not. As explained herein, targeted cellular broadcast messages ("TCBMs") can be used for these needs. With a TCBM, the message might be broadcast to many UEs, but a given UE is programmed to filter or ignore those messages not directed to that UE. This selectivity can be provided by a TCBM including a location ID, which can be embedded into a body of a cellular broadcast message so that the cellular broadcast message can be sent over infrastructure that is agnostic to there being a TCBM embedded therein. UEs can be programmed with filter modules that process received cellular broadcast messages, consider the location ID of the embedded TCBM and further process it or drop it. Network-level filtering can also be provided, at least in the case of orbital base stations, by broadcasting using signal parameters (such as delay, Doppler shift, etc.) so that targeted UEs perceive the cellular broadcast messages as correct per their agreed protocol and non-targeted UEs perceive the cellular broadcast messages as noise or incorrect per their agreed protocol.

Some messaging can be focused on particular geographic subsets of a satellite's footprint, perhaps by deploying the delay and Doppler shift techniques of Speidel I, for example, so that some messages are received in targeted geographic areas and appear as out-of-spec signals in other geographic areas and are thus ignored or discarded by UEs that are outside the targeted geographic areas.

Additionally, the filtering can be done at the network level by applying the cellular broadcast message only to certain beams deployed by the satellite, which may implement the delay and Doppler shift technique of Speidel I as well. The satellite base station may comprise a plurality of beams where each beam contributes an RF footprint to some subset of the larger satellite field of view, which might have a more limited delay and Doppler contour spread relative to the larger satellite field of view. Additionally, these beams may allow for higher bandwidth communications, allowing for more message delivery density in the method described herein.

FIG. 1 illustrates a telecommunications network involving orbital base stations and terrestrial user equipment (UE), according to an embodiment. As shown there, on the surface 102 of the Earth (or other planetary or celestial body, for that matter) there are several UEs 104 that can be mobile or possibly portable or stationary but functioning as UEs. These UEs 104 communicate with orbital BTSs 106 over BTS-UE links, such as those described in Speidel 1. As illustrated, each of the BTSs 106 has an orbital velocity relative to the surface 102, as well as some separation distance.

Figure 2:
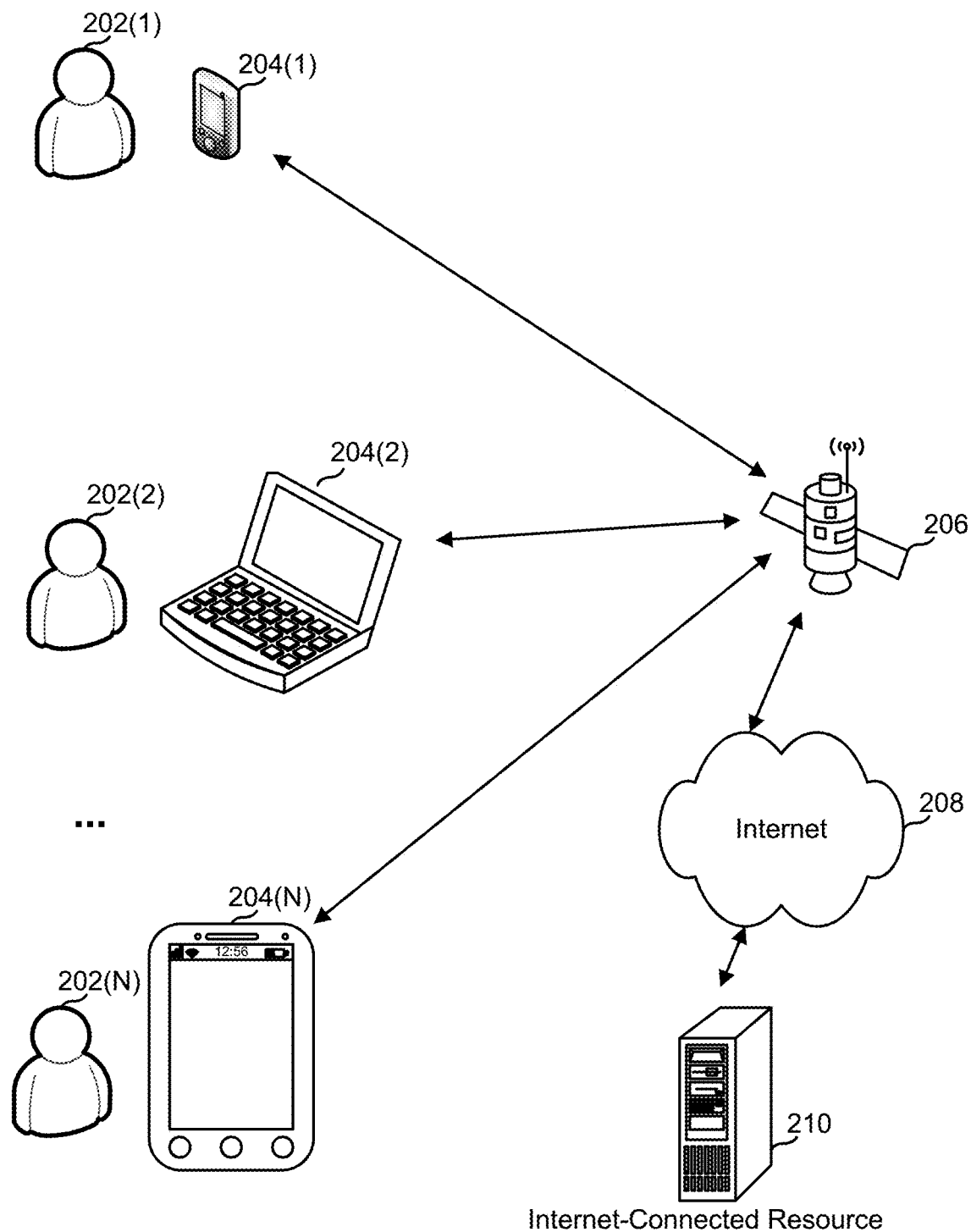
FIG. 2 illustrates examples of uses of an orbital base station to connect a UE to Internet-connected resources, according to an embodiment.

FIG. 2 illustrates examples of uses of an orbital base station to connect a UE to Internet-connected resources, according to an embodiment. FIG. 2 illustrates additional examples for the environment of FIG. 1, wherein persons 202 have various devices 204 that include elements that constitute a mobile station, such as a smartphone 204(1), a laptop computer 204(2), and a tablet device 204(N), each of which are configured and/or adapted to communicate with a terrestrial BTS and where persons 202 desire to communicate or access the Internet 208 and/or Internet-connected resources 210, they can do so via BTS 206. Other examples of devices might be user interfaceless devices such as industrial or home equipment that interacts over a network (e.g., "Internet of Things" devices). Such devices might connect to terrestrial base stations when such are available.

Figure 3:
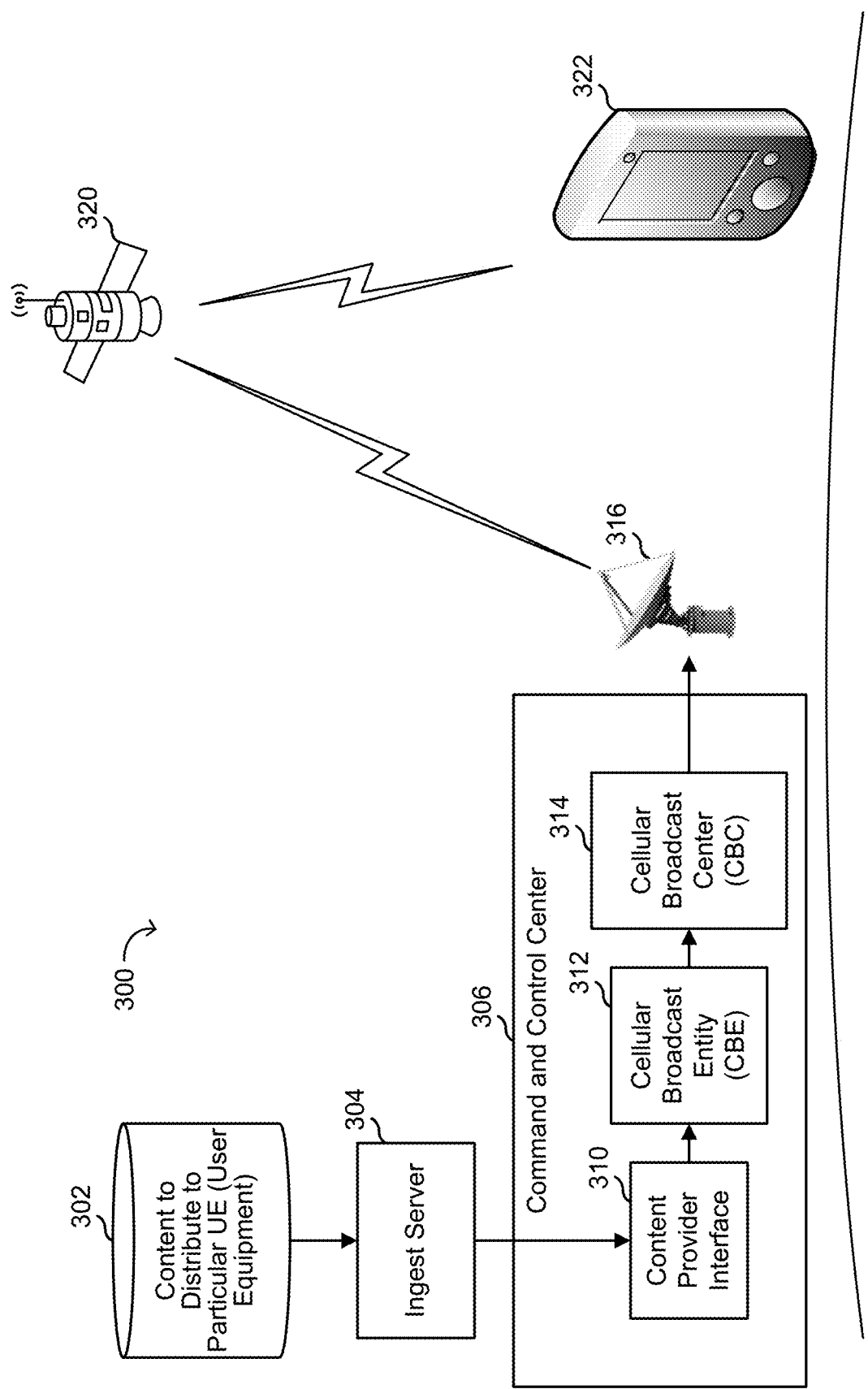
FIG. 3 illustrates an example of conveying content to a UE via cellular broadcast messages, according to an embodiment.

FIG. 3 illustrates an example 300 of conveying content to a UE via cellular broadcast messages, according to an embodiment. As illustrated there, to be distributed to the UE is stored in storage 302 and provided to an ingest server 304. A command and control center 306 can receive content from ingest server 304 and provided to a content provider interface 310. A cellular broadcast entity (CBE) 312 and receive data from content provider interface 310 and provide them to a cellular broadcast center (CBC) 314, which in turn can construct cellular broadcast messages and convey those to an uplink ground station 316 and provide those in a proprietary protocol or a standard protocol to an orbital base station 320. In some embodiments, the CBE and the CBC are implemented in a command and control center and/or, in others, on the satellite.

Orbital base station 320 can transmit a signal, such as those described in Speidel I, for receipt by the user equipment 322 possibly using conventional cellular broadcast protocols. Orbital base station 320 can transmit signals to terrestrial user equipment with particular delay characteristics and Doppler shifts as explained in more detail herein.

Figure 4:
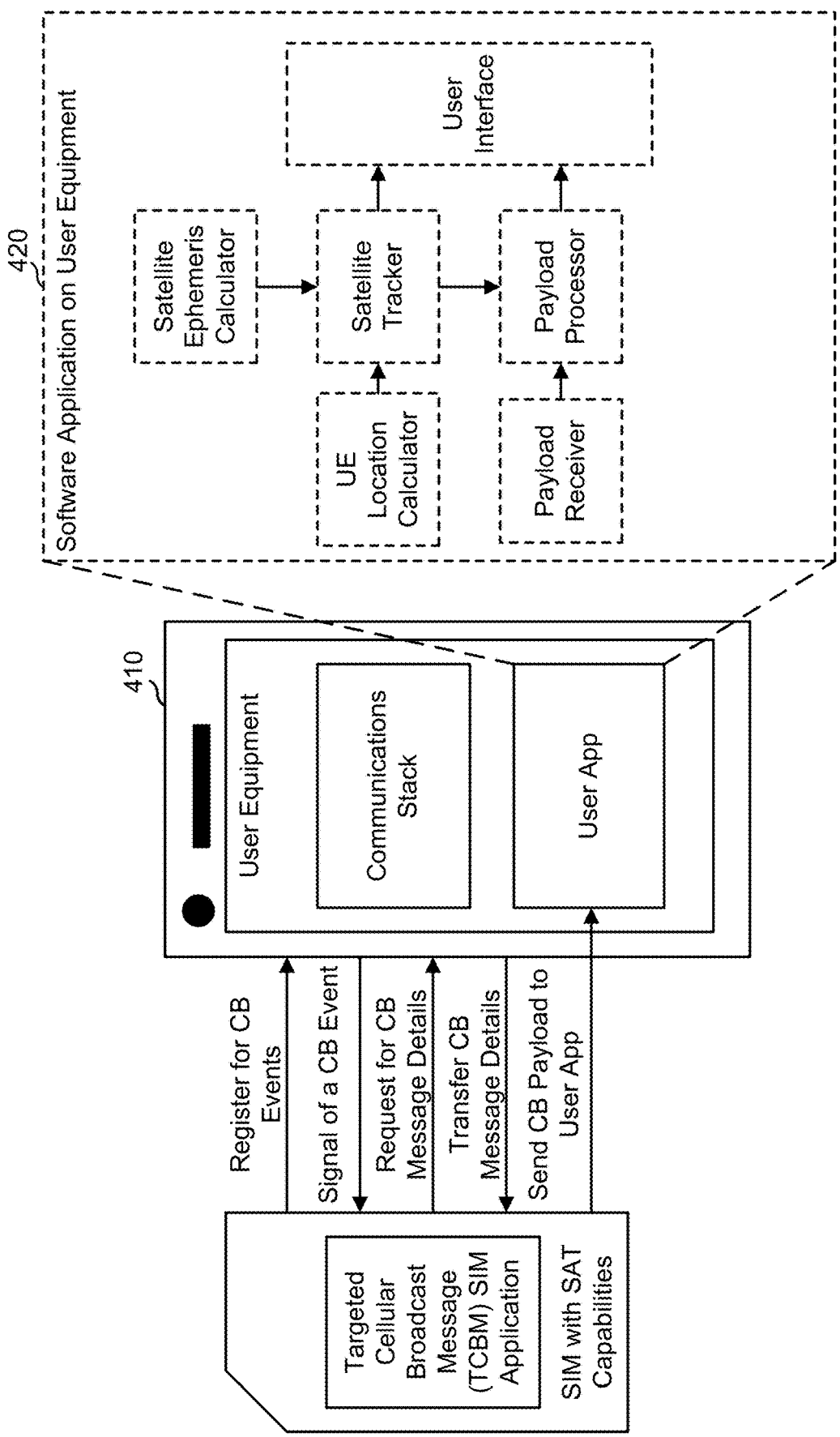
FIG. 4 illustrates hardware and software as might be present in a UE and accompanying SIM card, according to an embodiment.

FIG. 4 illustrates hardware and software as might be present in a UE, according to an embodiment. As illustrated there, a UE device 410 might comprise user equipment with an inserted SIM card. The UE device 410 might include various software components 420, including a satellite ephemeris calculator, a cellular broadcast receiver, a cellular message payload processor, a satellite tractor, and a location calculator.

Figure 5:
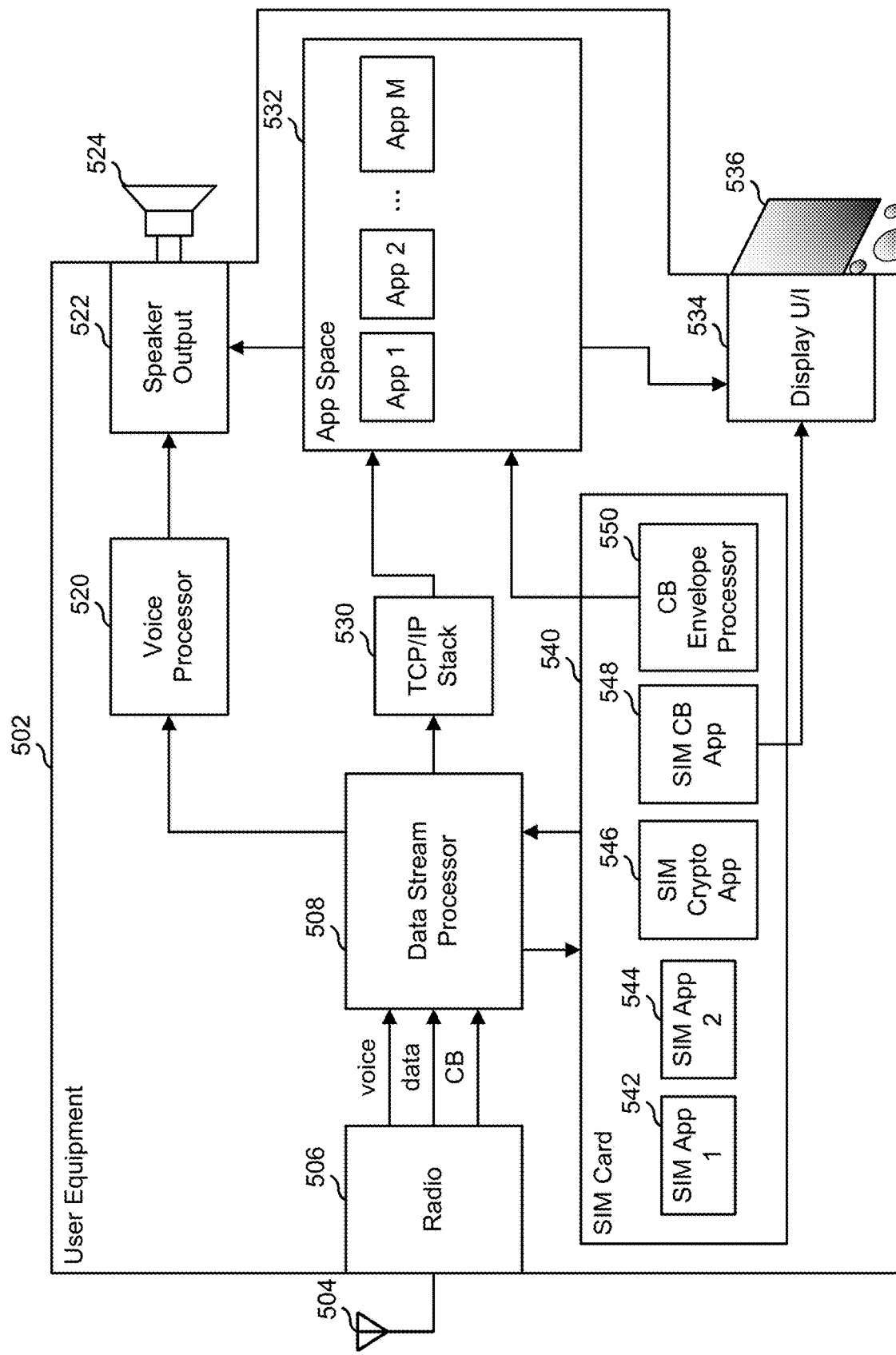
FIG. 5 illustrates elements of a UE as might be involved in processing signals received by the UE, according to an embodiment.

FIG. 5 illustrates elements of a UE as might be involved in processing signals received by the UE, according to an embodiment. As illustrated there, a UE device 502 might include an antenna 504, a radio 506 and a data stream processor 508. Radio 506 might receive and convey to data stream processor 508 signals related to voice, data, and cellular broadcasts. Data stream processor 508 might convey the voice signal to a voice processor 520, which in turn might convey voice signals to a speaker output 522 to be played to the user on speaker 624.

Data stream processor 508 might convey data signals to a TCP/IP stack 530 that can be used to convey data to an app space 532 for conveying data to various apps therein. When a cellular link is present that carries full, point-to-point data traffic, apps that consume data from outside UE device 502 can receive that data over a possibly conventional data channel providing data over the UE device's internal TCP/IP stack.

A SIM card 540 might insert call-back hooks for data stream processor 508 to provide notices of events to SIM card 540. When SIM card 540 is notified of events, such as an incoming call, an outgoing call, a cellular broadcast message, etc., it can provide that notice to a SIM app 542, 544, a SIM crypto app 546 for performing secure cryptographic operations, a SIM cellular broadcast (CB) app 548 that might detect incoming cellular broadcast messages according to a conventional cellular broadcast protocol and output those to a display user interface 534 for display on a display 536 for a user.

SIM card 540 might also be configured with a novel cellular broadcast envelope processor 550 that can process received cellular broadcast messages and provide one-way data to apps in app space on the UE 532, which can be useful when a full data channel is not available.

Figure 6:
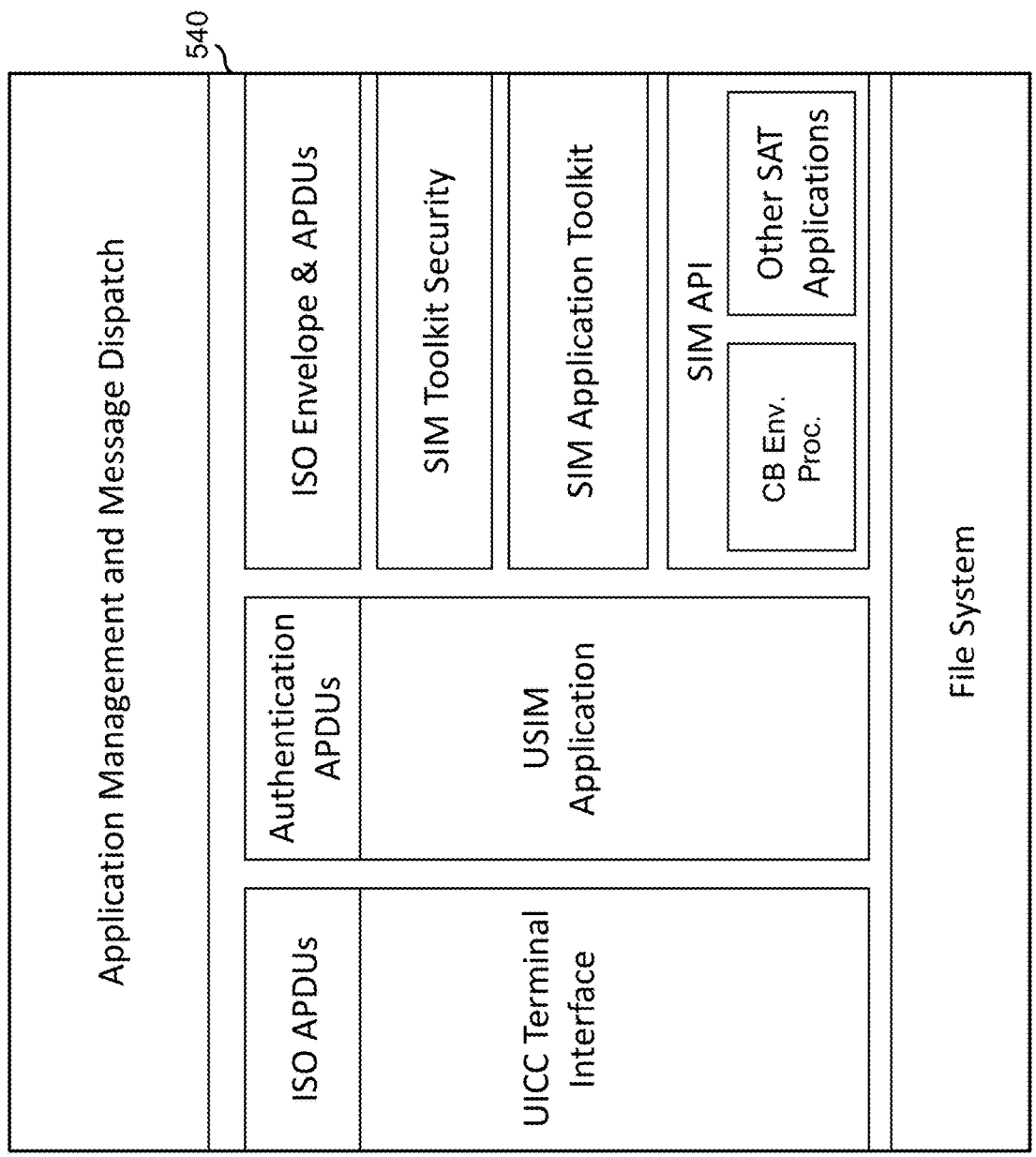
FIG. 6 illustrates elements of a SIM card in additional detail, according to an embodiment, including details of uses of a SIM Application Toolkit (SAT).

FIG. 6 illustrates elements of SIM card 540 in additional detail, according to an embodiment, including details of uses of a SIM Application Toolkit (SAT).

Figure 7:
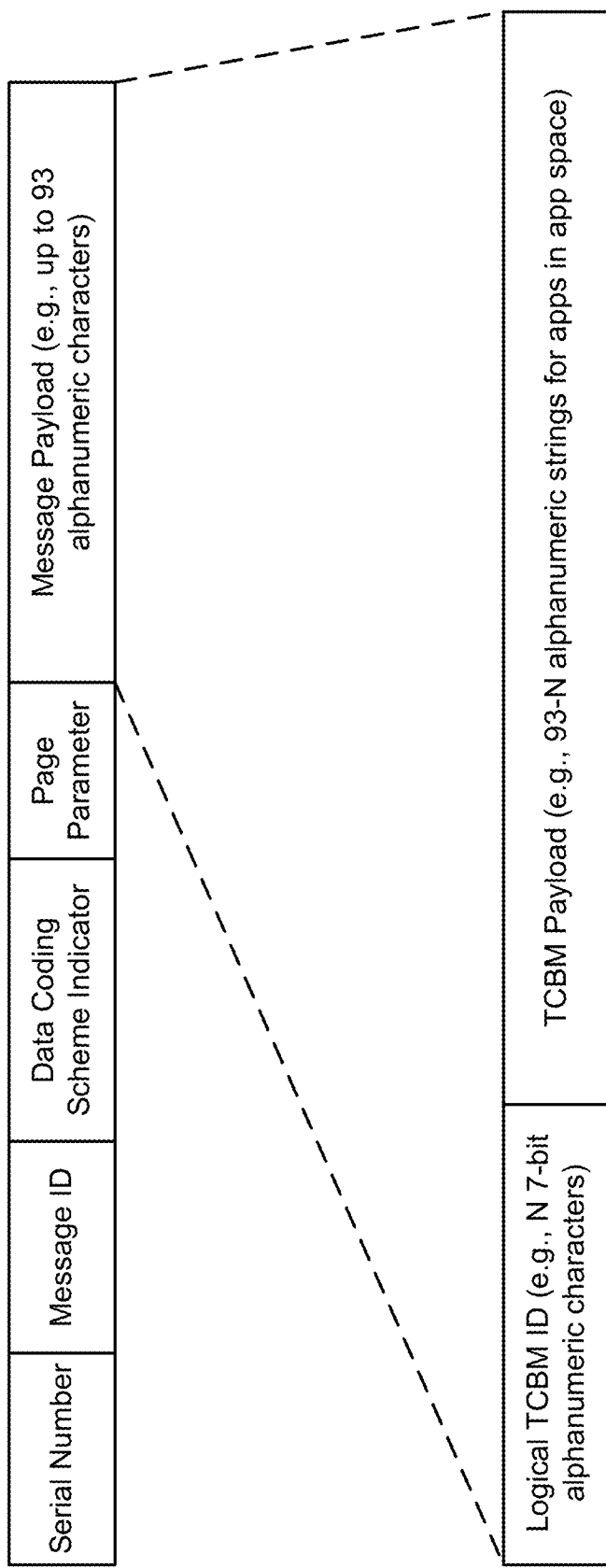
FIG. 7 illustrates a first example message, as might be constituted in a data structure transmitted over a telecommunications network.

FIG. 7 illustrates a first example message, as might be constituted in a data structure transmitted over a telecommunications network. In the first example message format, a logical ID is included within a cellular broadcast message body to indicate a destination subset of UEs that are to receive the message. In a second example message format, illustrated in another figure, a logical ID might be included in the message itself, but might also be used to allocate and direct messages based on signal characteristics. Such signal-characteristic filtering might be used with orbital base stations, taking into account that some signal characteristics (such as signal delays, frequency shifts, the variations, etc.) could result in a cellular broadcast message being correctly received by certain UEs, such as those within a predetermined geographical range, and incorrectly received by other UEs, therefore providing a filtering effect.

As shown in FIG. 7, a standard cellular broadcast message might be broadcast by an orbital base station with the message having a serial number, a message identifier, an indicator of a data coding scheme, a page parameter, and a cellular broadcast message payload. In some protocols, the cellular broadcast message payload comprises up to ninety-three alphanumeric characters.

As illustrated in FIG. 7, a message might be represented by a data structure having the fields shown. A CB envelope processor, such as CB envelope processor 550 shown in FIG. 5, might be configured to read the logical ID field of the message body and interpret that as a logical ID, and then filter messages accordingly and/or forward them to an appropriate app. The CB envelope processor might be configured with a lookup-table mapping logical IDs to apps, perhaps with a table of logical IDs to process and/or a table of logical IDs to ignore. A logical ID might correspond to a certain message type or to a predetermined group of recipients. As an example, there may be a weather forecast broadcast service that uses a certain message ID, a news broadcast service with another message ID, and a commercial broadcast services with another. As illustrated, the logical ID could be selected from an alphabet of some available logical IDs. In the example shown, one or N alphanumeric characters at the start of a cellular broadcast message is reserved for the logical ID. Assuming a 7-bit alphanumeric character, there could be 128 available logical IDs. In the general case, the logical ID occupies N 7-bit alphanumeric character, allowing for up to $2^{7N}$ possible logical IDs.

A filtering module of CB envelope processor 550 might read the inclusion and/or exclusion lists and process received messages accordingly, passing on messages that have included logical IDs and dropping those that do not or that are on the exclusion list. The lists might be based on user selections and preferences. Thus, a subscriber might specify which logical IDs they subscribe to.

CB envelope processor 550 might read the inclusion and/or might receive as an input messages. But because such messages can be received via cellular broadcast, the messages might be received by UEs even if they have not registered with a base station and even if they are operating on an edge of a network with signal levels too low for two-way communications but perhaps with enough signal energy on the downlink for cellular broadcast.

As illustrated in FIG. 7, a cellular broadcast message has a message ID. A CB envelope processor could use the message ID as well. For example, a CB envelope processor might ignore messages with message IDs are already allocated for existing messaging services (e.g., emergency messaging, etc.). Those might be handled by a SIM SAT CB app such as SIM SAT CB app 548 shown in FIG. 5. The message IDs specifically for this filtering process might vary by country, region, state, etc. depending on what message IDs are already allocated for existing messaging services and may correspond to a message ID allocated for commercial broadcast messaging.

The logical ID need not be at the start of the cellular broadcast message body as shown in FIG. 7 but could be at other places in a message. Delimiters might be used to delineate a logical ID from the rest of a message body. Multiple logical IDs might be used and preferably a CB envelope processor is configured to understand a layout of a cellular broadcast message that accommodates logical ID filtering. Some logical IDs might be associated with topics (e.g., news, weather, advertisement, etc.) or be associated with groups of people.

A UE might run multiple CB envelope processors, each having a filtering module for filtering based on logical ID, or a common filtering module might be used by multiple applications. Applications might include commercial applications and public safety applications. Commercial applications might include subscription-based alerts such as news headlines, sports news, weather alerts, etc. Public safety applications might include the ability to notify users in remote and rural areas that help is on the way when they ask for help using personal locator beacons. Personal locator beacons can send SOS signals to rescue agencies and, where rescue agencies are able to locate those users, they can send messages to the message server that are specific to UEs at that location, whether the person who triggers the SOS signal or those in proximity, who might be in a position to help. Other applications might include one-way one-to-one messaging and one-way one-to-many messaging.

With a logical ID alphabet of IDs that occupies N 7-bit alphanumeric characters, for up to $2^{7N}$ logical IDs, for some N>4, for example, each UE and each individual could have a unique logical ID. This would allow a telecommunications network to send a cellular broadcast message that is only processed by one UE and/or by one individual (one individual might have all of their UE devices programmed to process all messages for the same logical ID. Other logical IDs might be allocated to groups of millions of users. In any case, since the messages are broadcast and each UE determines which ones to process, the telecommunication network does not have to be aware of where the UE is and a back channel for two-way communications is not required.

In some embodiments, the UE is configured such that cellular messages with some logical IDs will be dropped with certain logical IDs without the end user being able to alter which ones are dropped. This would allow for essentially private messaging. For example, all CB envelope processors could store a logical ID from a set of exclusive logical IDs, each of which is associated with one UE, user, or entity. For example, the range of logical IDs from "AAAAAAA" to "AA99999" might be designated as exclusive logical IDs and one UE might be assigned the logical ID "AAR5e4D", with no other UE being assigned that logical ID. All UEs except one would drop any messages with a logical ID of "AAR5e4D" and so only one UE would present that message to its user, making it essentially private messaging over a broadcast. In addition to having UEs programmed to ignore messages not specifically directed at them, the message bodies might be encrypted so that even a rogue UE could not easily read a cellular broadcast message destined for someone else based on the logical ID. The logical ID and corresponding encryption keys can be stored and used at the server to encrypt messages and in the UE application or CB envelope processor to decrypt messages.

Some logical IDs might be specific to geographic regions, such as "GG45rXk" being the logical ID for some small portion of the South Pacific. The CB envelope processor might consult a location module of the UE, which might operate based on the GPS system, to determine a location of the UE and update the UE's inclusion list to include "GG45rXk" if the UE is within that small portion of the South Pacific and remove that location ID when outside that small portion. In this manner, geographically-specific messages can be sent. Different logical IDs might be associated with different geographical areas. For example, delivering localized weather information via an orbital base station with large spotbeam could utilize a geographical location ID so that UEs outside the geographic region (but within the spotbeam) will ignore the message. Software in the UE may source the GPS location of the UE and use that to dynamically "subscribe" to geographically relevant messages that might be broadcast from a service that they have subscribed to (e.g., weather).

Of course, where a local base station for a given UE or group of UEs is known and accessible, the server sending the cellular broadcast message could also provide some filtering by sending the cellular broadcast message to less than all possible base stations. Granularity at the level of individual users could be achieved, as described. This might lessen traffic requirements on other channels deployed by the network.

Some TCBMs might be filtered based on their message ID and/or logical ID. Messages can also be filtered geographically by having a transmitting orbital base station transmit a CB with a particular delay and/or a particular Doppler shift so that the message is correctly received by some UEs and not correctly received by others. Additionally, directive beams can be used to focus the signal energy such that the broadcast is received by certain target UEs in a certain location on the Earth and are not of an amplitude high enough to be received by UEs outside of those locations.

With signal filtering, messages are sent from an orbital base station with signal characteristics that are such that reception outside of some geographic area would be expected to fail and thus operate as another filtering function. For example, the orbital base station might send a cellular broadcast message with a particular Doppler offset and the result being that UEs in front of the orbital base station's orbit position would receive the signal within an understandable frequency range but UEs behind of the orbital base station's orbit position would receive the signal with an unacceptably low frequency, or unacceptably low signal energy, and treat the transmission as an unrecoverable error, or not receive the signal at all (e.g. below the noise floor).

A multi-message cellular broadcast message might use delimiters, as shown, to delimit multiple TCBMs in the multi-message cellular broadcast message. A multi-message cellular broadcast message might be used where bandwidth and/or time are limited. For example, an orbital base station might have a limited window in which to transmit messages in one overpass. A satellite overpass might be a few minutes. Terrestrial base stations might be less constrained as they do not normally move, but they might be constrained by the movement of mobile phones through their coverage area. Increasing the number of sent messages can be achieved if the cell tower broadcasts over multiple BCCH channels by allocating multiple PLMN IDs to the mobile network. This way multiple TCBMs can be received by the UE simultaneously. For example, if the UE can receive 100 TCBMs during one overpass, by sending 2 TCBMs simultaneously over multiple BCCH channels, the UE will be able to receive 200 TCBMs.

Another method for increasing messages can be done through concatenation of messages one after the other within the 15-page structure of a single individual broadcast. A single message plus its logical ID might be 93 characters or less, fitting into a single page in the cellular broadcast message. In that case, a second message may be started directly thereafter and even allowed to carry over into the next cellular broadcast page. In this way, multiple TCBMs can be transmitted in a single cellular broadcast message, each with their own unique logical ID. The logic for how messages are transported in groups within one cellular broadcast could be handled by logic at the application server and processed at the UE.

Figure 8:
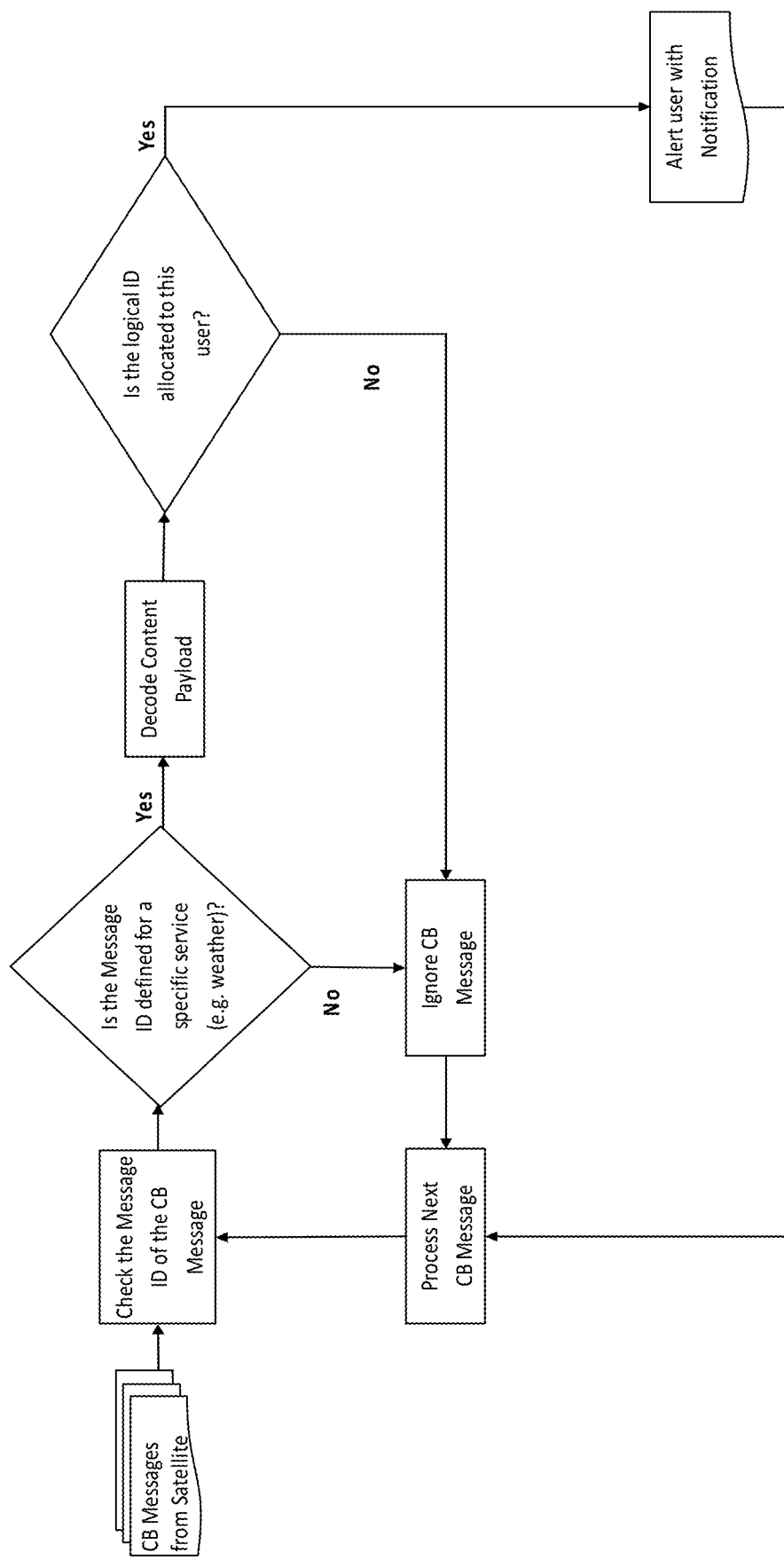
FIG. 8 is a flowchart of a CB Message processing method for a targeted cellular broadcast message ("TCBM"), according to an embodiment.

FIG. 8 is a flowchart of a CB Message processing method for a targeted cellular broadcast message ("TCBM"), according to an embodiment.

Figure 9:
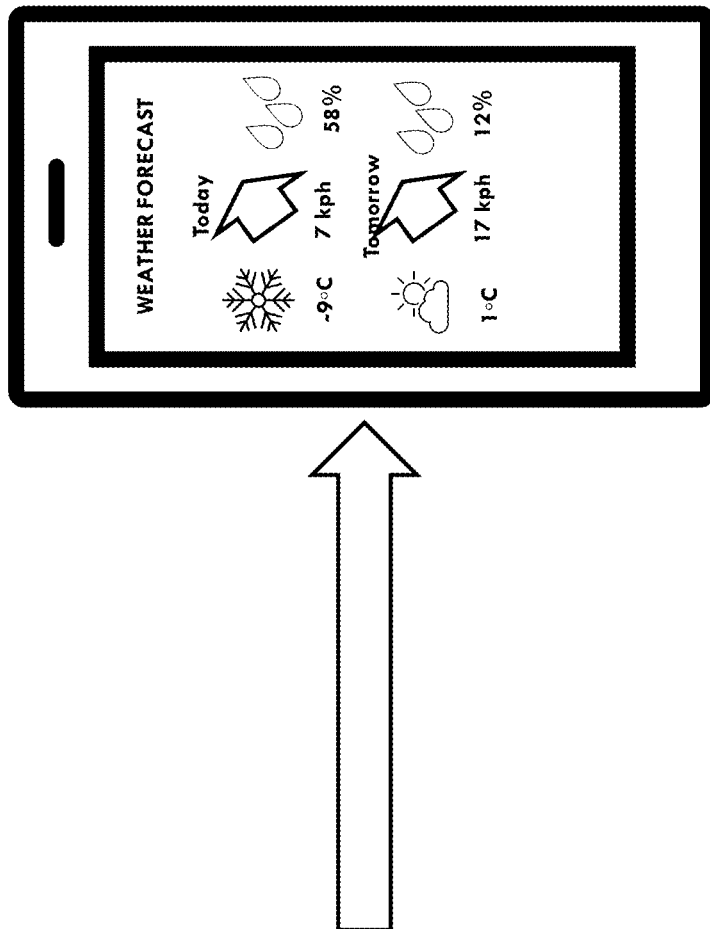
FIG. 9 illustrates an example of a TCBM message being received and used by an app on a UE, according to an embodiment.

FIG. 9 illustrates an example of a TCBM message being received and used by an app on a UE, according to an embodiment.

Figure 10:
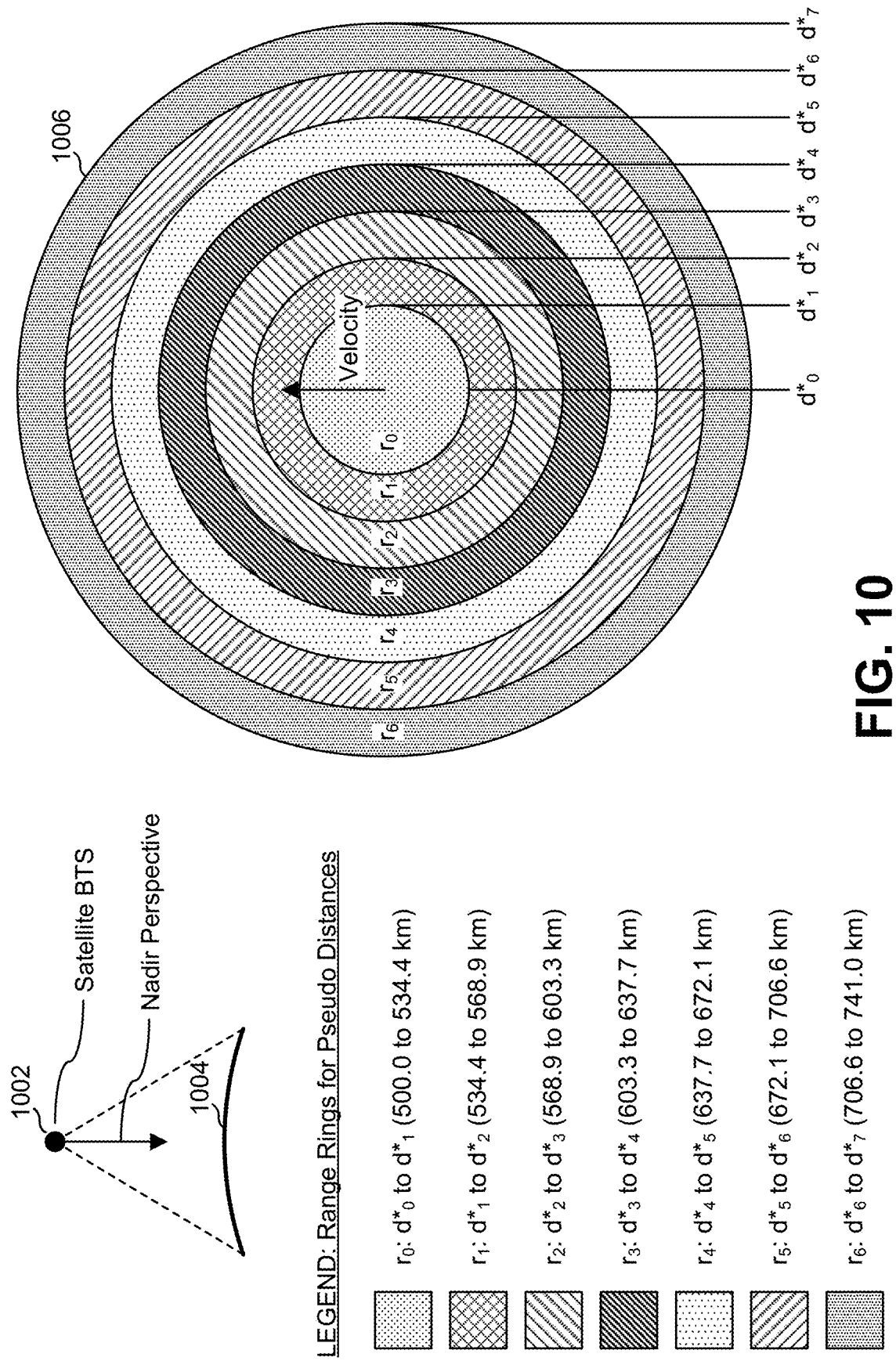
FIG. 10 illustrates an example of a satellite footprint and the resulting distance ranges within that satellite footprint.

FIG. 10 illustrates an example of a satellite footprint, rings, and the resulting distance ranges for rings of that satellite footprint. A satellite 1002 would have a coverage footprint that in FIG. 10 is illustrated edge on as footprint 1004 and from above as footprint 1006. The different cross-hatching in footprint 1006 indicates different distance ranges between the surface and the BTS, which form rings. In this example, there are seven rings, but more or fewer might be present, depending on needs. In this example, the rings are labeled $r_0$ through $r_6$ and correspond to the BTS-UE distance ranges (which might be pseudo distance ranges) of {500-534.4, 534.4-568.9, 568.9-603.3, 603.3-637.7, 637.7-672.1, 672.1-706.6, 706.6-741} (all in km). Each of these ranges happens to be just less than 35 km, which is a useful design choice as explained below. Other applications might use different design choices. In an initial handshake, such as a RACH process, a BTS-UE distance is determined and then a UE can be assigned to one of the rings in the satellite footprint.

As explained below, UEs assigned to a particular one of the rings might all be assigned to one carrier frequency or block of carrier frequencies over which a TDMA/FDMA frame is transmitted, or other approaches might be taken. In some embodiments, the rings might overlap such that a UE can be in more than one ring. For example, the first two rings might be 490-540 and 530-580, so a UE at 535 km from the BTS can be in either of those rings.

Depending on the desired application, an orbital BTS might adjust its protocols and operations according to (1) timing advance method, (2) an extended range method (using fewer than all timeslots that are available and instead using unused timeslots as guard bits), (3) a sorted extended range method (using fewer than all timeslots that are available and instead using unused timeslots as guard bits, allocated between timeslots where the timeslots are assigned based on expected variable delays), (4) a ring extended range method (shifting timing so that coverage is a ring with an inner circle that is not supported), (5) a multi-ring extended range method (like method (4) with multiple rings to cover different ranges of distances at the same time and UEs assigned to a ring based on its BTS-UE distance) and (6) a sorted channel-ring allocation method (like method (5)

and with different rings associated with different carrier frequencies and, for a carrier frequency, method (3) is used for the UEs within that ring's distance range to allocate timeslots), or a combination of one or more of (1), (2), (3), (4), (5) and (6).

Figure 11:
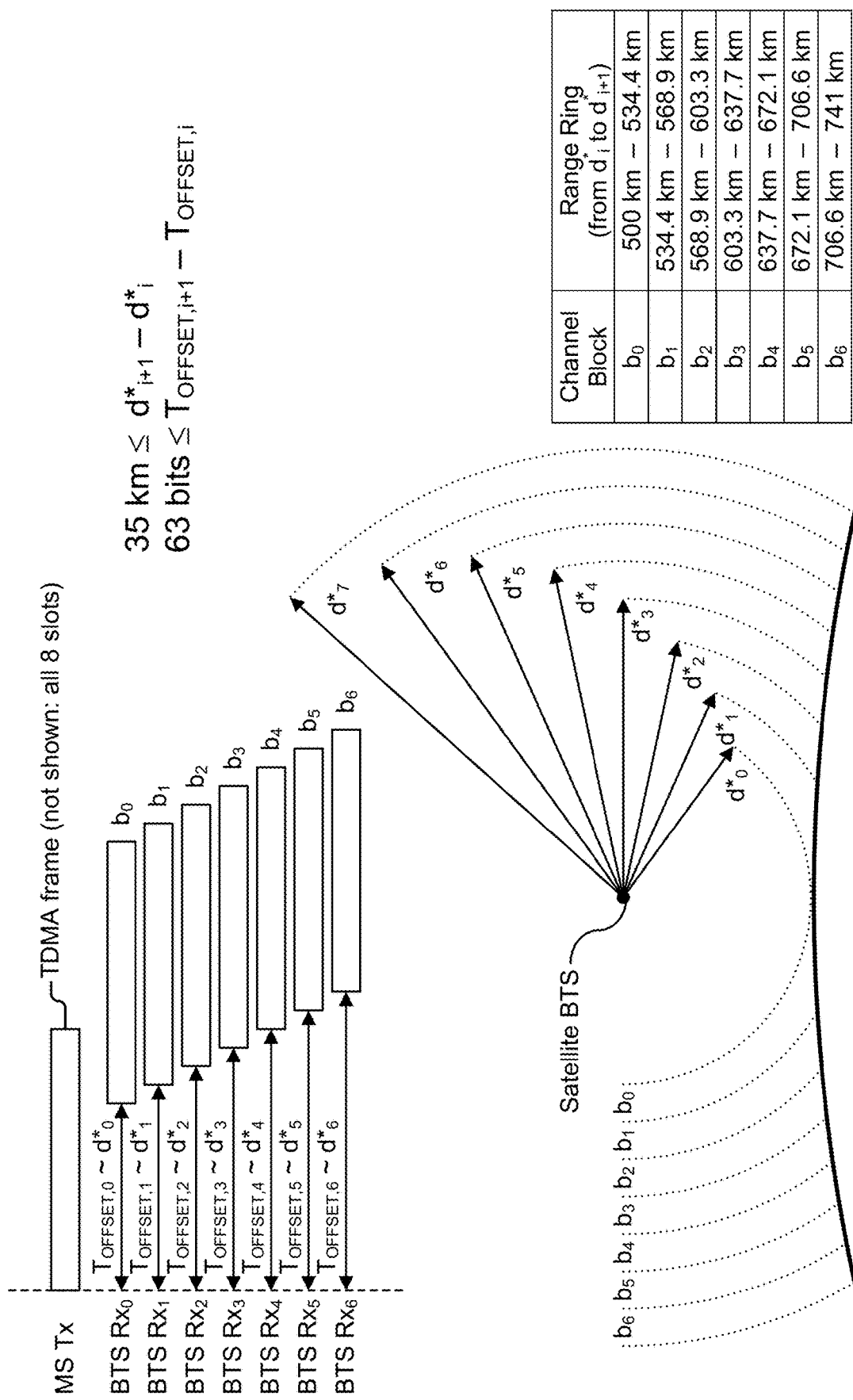
FIG. 11 illustrates how different mobile stations might be assigned different carrier frequencies based on their terrestrial location distances so that the ring method can be used with varying ring diameters for different carrier frequencies.

FIG. 11 illustrates how different mobile stations might be assigned different channels based on their terrestrial location relative to the BTS so that the ring method can be used with varying ring diameters for different channels. As shown there, a method that uses timing advance (for a ~0 to 35 km range) and a sorted channel-ring allocation method can provide around another 241 km of range without using up timeslots. With the sorted channel-ring allocation method, the satellite footprint is divided up into rings as illustrated in FIG. 10 and each ring is paired with a distinct carrier frequency. Each ring operates with a different synchronization offset.

As used herein, a channel might comprise one or more specific frequency divisions in a protocol, such as a group of carrier frequencies. In FIG. 11, the range of supported pseudo distances between the nearest and farthest potential targets is 241 km, partitioned into seven pseudo distance range rings. This results in coverage ranges of around 34 km per ring and the synchronization offsets can be different for different rings assigned to channel blocks or sets of channels. By having the offsets from channel block to channel block be less than around 35 km, full throughput is possible in each channel by eliminating the need for extra slot guard periods and then timing advance by itself is sufficient.

RACH request bursts can be used to determine the propagation distance from each UE's signal. The BTS can use the broadcast channel (BCCH) to constantly or periodically notify UEs on the RACH as to which carrier frequency and timeslot the BTS assigns to that UE for use to uplink. The BTS would know exactly when the UE will transmit its RACH burst and can count the number of bits between that time and when the actual burst arrives. By dividing that number of bits by the channel bit rate (270.83 kbps for GSM), the BTS can calculate the round-trip propagation delay time. The BTS then calculates the propagation distance, or pseudo distance, by dividing the speed of light by the round-trip propagation delay time. Depending on the calculated pseudo distance, each UE qualifies for an assignment to a channel in a particular channel block. For instance, in the configuration shown in FIG. 11, channels in channel block $b_0$ are assigned to UEs that have calculated pseudo distances between 500 km and ~534 km; channels in channel block $b_1$ are assigned to UEs that have pseudo distances measured between ~534 km and ~568 km from the on-orbit BTS, and similarly for other ranges as shown in FIG. 10 and FIG. 11.

Figure 12:
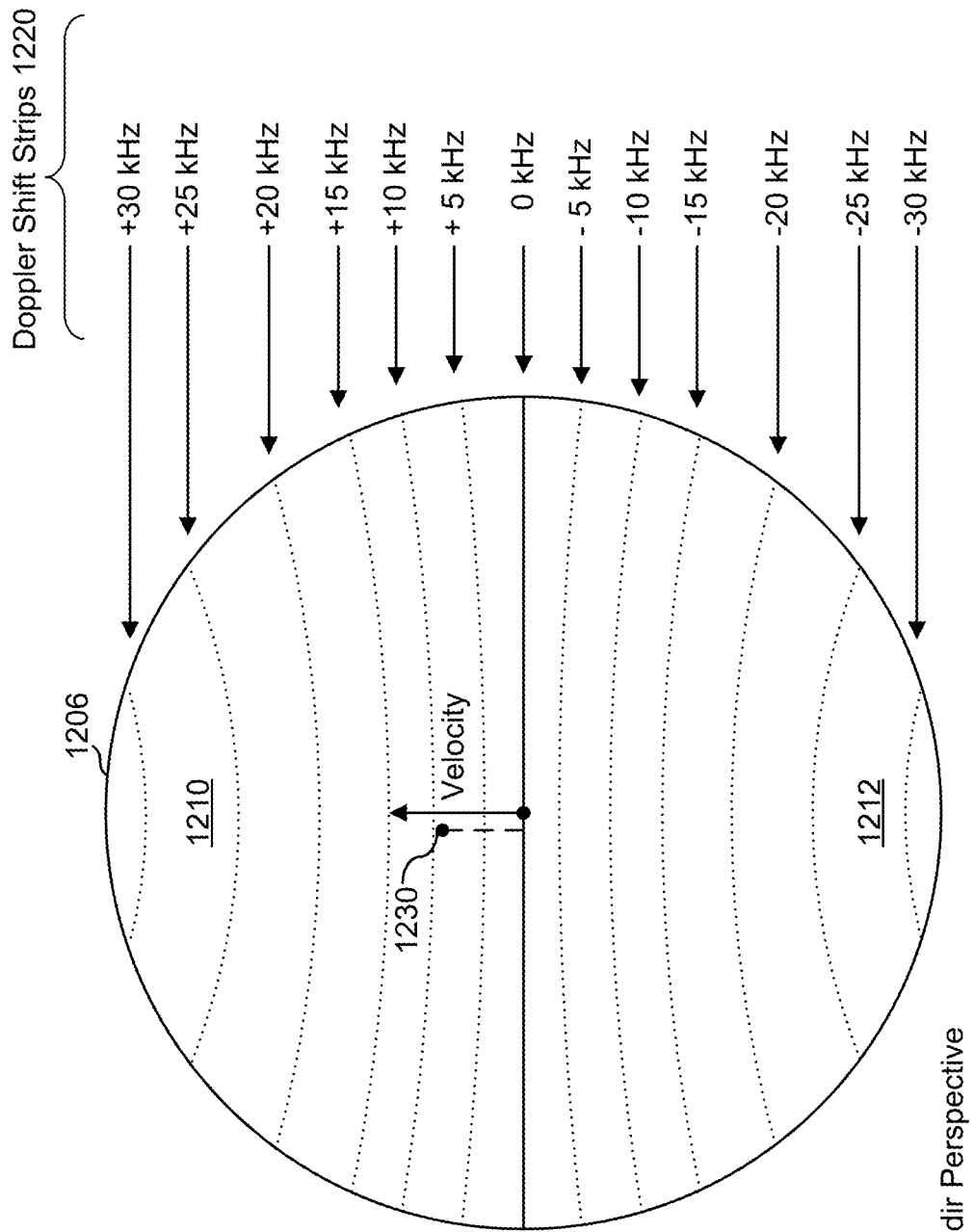
FIG. 12 shows how a satellite footprint might be subdivided into Doppler shift strips.
Figure 12:
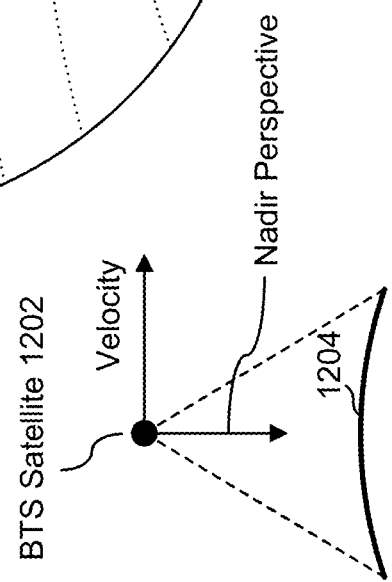

The first channel block, $b_0$, has uplink TDMA frames that are offset from the transmit uplink frames by the same amount as shown in FIG. 12. The following channel block, $b_1$, has frames that are offset by an additional ~62 bits from the frame of channel block $b_0$. Each channel block's frame thereafter has ~62 bits in additional offset compared to the previous channel block (i.e., the frame of channel block $b_{i+1}$ is offset an extra ~62 bits from the frame of channel block $b_i$). This configuration, leveraging 62 bits, creates the various coverage rings, each ~34 km, as each bit of frame offset corresponds to around 555 m, and each ring/channel block is extended ~34 km further than the prior one. By assigning various synchronization offsets, each channel block exhibits coverage of a different ring in space (and on the surface of the Earth). When the channel blocks are given synchronization offsets in increments of 62 bits and the classic embodiment of GSM is used, full throughput can be achieved on every channel, and vastly expansive coverage can be accomplished. This can be done without requiring modification of a GSM UE. A top-down view of the range rings is shown in FIG. 10. Each range ring's channel block is defined by a distinctive "range of distances" which is prescribed for this particular embodiment in the key to the left in FIG. 10.

While the above methods and their variations can provide maximum throughput for all channeled spectrum, the frequencies of transmissions might be different on transmission and reception due to relative movement of the BTS and the UEs. A Doppler solution can be used to account for scenarios in which multiple UE may exist within similar pseudo distance ranges from the on-orbit BTS experiencing a wide variance in perceived carrier frequency shift. For instance, consider two UE that are calculated to exist within the same ring/channel block, $b_6$, in FIG. 10, where one UE is positioned at the top forward tip of the satellite coverage footprint while the other is positioned at the bottom tip of the satellite coverage footprint.

In FIG. 10, the satellite is directly above the center of the coverage area indicated for channel block $b_0$ (at the origin of the arrow) and is moving in the direction of the arrow labeled "velocity". A first UE in front of the satellite velocity vector will experience a positive Doppler shift in received frequency, while a second UE behind the satellite velocity vector will experience a negative Doppler shift in received frequency. If these UEs are assigned the same frequency, the satellite could receive signal burst frequencies from the UEs that are many kilohertz apart (up to 70 kHz apart, in the case of 1800/1900 GSM band). Furthermore, assigning adjacent channels to UEs that experience widely different Doppler shift environments could result in signal interference at the satellite.

FIG. 12 shows how a satellite footprint might be subdivided into Doppler shift strips for methods of mitigating this issue. As illustrated there, assume a satellite 1202 traveling with a velocity relative to the surface 1204 of the Earth. The satellite footprint 1206 is a view from the satellite with the velocity as indicated. A UE in area 1210 of the satellite footprint 1206 vector will experience a positive Doppler shift in received frequency of signals from satellite 1202, whereas a UE in area 1212 of the satellite footprint 1206 vector will experience a negative Doppler shift in received frequency of signals from satellite 1202. The specific Doppler shift in received frequency can be determined using simple geometry, and for ranges of Doppler shifts, the satellite footprint 1206 might be divided into strips delimited by the contour lines and the contour lines assigned values 1220 for their respective Doppler shifts.

In three-dimensional space, the Doppler shift at any point within the satellite footprint can be calculated by the BTS or the UE, given sufficient information. One method of doing so might assume all vectors are represented in the Earth-Centered, Earth-Fixed (ECEF) coordinate frame. This is also known as Earth's rotating frame because it is the coordinate system that rotates in space with the Earth around its axis of rotation). In this process, each of the vectors are treated as vector quantities with three component values, such that each component value in the vector represents a value along each dimension of the coordinate frame represented by the vector. Such numbers can be stored in memory for a processor to manipulate.

If $r_{BTS}$ represents the position vector of the satellite in ECEF coordinates and $r_{UE}$ represents the position vector of the UE in ECEF coordinates, then the position vector of the UE with respect to the BTS would be $\underline{r}_{UE/BTS}=\underline{r}_{UE}-\underline{r}_{BTS}$. Similarly, if $\underline{v}_{BTS}$ represents the velocity vector of the satellite in ECEF coordinates and $\underline{v}_{UE}$ represents the velocity vector of the UE in ECEF coordinates, then the velocity vector of the BTS with respect to the UE is $\underline{v}_{BTS/UE}=\underline{v}_{BTS}-\underline{v}_{UE}$. To calculate the Doppler shift, the magnitude of the component of the BTS's velocity with respect to the UE, $\underline{v}_{BTS/UE}$, in the direction, or unit-vector, of the position of the UE with respect to the BTS, $\underline{r}_{UE/BTS}/\|\underline{r}_{UE/BTS}\|$, a processor computes this position and then divides by the wavelength of the assigned carrier frequency wave. This can be done using the dot product of the two vectors of interest, $\underline{v}_{BTS/UE}$ and $\underline{r}_{UE/BTS}/\|\underline{r}_{UE/BTS}\|$, and can be written as in Equation 1 and perhaps implemented in program code.

$$D = \left[v_{BTS/MS} \cdot \frac{r_{MS/BTS}}{\|r_{MS/BTS}\|}\right] * \frac{1}{\lambda} \quad \text{(Eqn. 1)}$$

In Equation 1, D is the computed Doppler shift and $\lambda$ is the wavelength of the carrier frequency wave, which can be computed as the carrier frequency divided by the speed of light.

By way of example, consider a spacecraft operating in an equatorial orbit at an altitude of 500 km and happens to be right above the prime meridian at a particular instant (e.g., directly nadir relative to the satellite is the intersection of the equator and the prime meridian). At the same particular instant, a stationary UE 1230 is positioned approximately at sea level below the spacecraft but rests on the equator at 1 degree east longitude (e.g., latitude longitude position can be described as [0, 1]).

In this scenario, the ECEF position coordinate of the satellite is approximately [6870 km; 0 km; 0 km]. The velocity vector of a spacecraft in a circular orbit at 500 km is approximately perpendicular to the position vector and parallel with the equator (for equatorial orbit). The magnitude of the velocity vector with respect to the Earth's surface can be calculated as SQRT(mu_earth/(R_e+h))−w_earth*(R_e+h)=7.11 km/s, where mu_earth is the Earth's gravitational constant (mu_earth=398658.366 km$^3$/s$^2$), R_e is the radius of the Earth at the equator (R_e~6370 km), w_earth is the angular velocity of the Earth's rotation (w_earth=7.27*10$^{-5}$ radians/second), and h is the altitude of the satellite (h=500 km in this example). The ECEF velocity vector of the spacecraft is therefore approximately [0 km/s; 7.11 km/s; 0 km/s]. The ECEF position of the stationary UE at 0 degrees latitude and 1 degree east longitude is approximately) [R_earth*cos(1°); R_earth*sin(1°); 0]=[6369 km; 111 km; 0]. The ECEF position of this stationary UE with respect to the spacecraft is therefore, [6369 km; 111 km; 0]-[6870 km; 0 km; 0 km]=[−501 km; 111 km; 0]. The Doppler shift of a 1900 MHz signal received by this UE from the spacecraft will therefore be as shown in Equations 2, 3 and 4.

$$D = \left[v_{BTS/MS} \cdot \frac{r_{MS/BTS}}{\|r_{MS/BTS}\|}\right] * \frac{1}{\lambda} \quad \text{(Eqn. 2)}$$

$$D = \left[\left[0; 7.11 \frac{km}{s}; 0\right] \cdot \frac{[-501 \text{ km}; 111 \text{ km}; 0]}{513.149 \text{ km}}\right] * \frac{1}{0.158 \text{ m}} \quad \text{(Eqn. 3)}$$

$$D = 9.734 \text{ kHz} \quad \text{(Eqn. 4)}$$

As explained above, the signal received from a UE on the RACH at the BTS can be used to calculate the pseudo distance. It can also be used to approximate the Doppler shift from the UE. Much like the BTS knows what timeslot the RACH is on, it also knows what carrier frequency it is on. So, when the BTS receives the RACH burst, it can measure the center of the burst frequency and calculate its offset (difference) from the expected center frequency on the RACH. This may or may not require the satellite BTS to listen on a wider frequency range on the RACH depending on what magnitude of Doppler shift the system experiences.

In FIG. 12, each dashed line defines a border for a Doppler shift strip that is used to localize the potential Doppler shift for each channel and, therefore, minimize interference. The curvatures of the contour lines on the map are a result of the geometry of the communication link as well as the frequency of communication.

Figure 13:
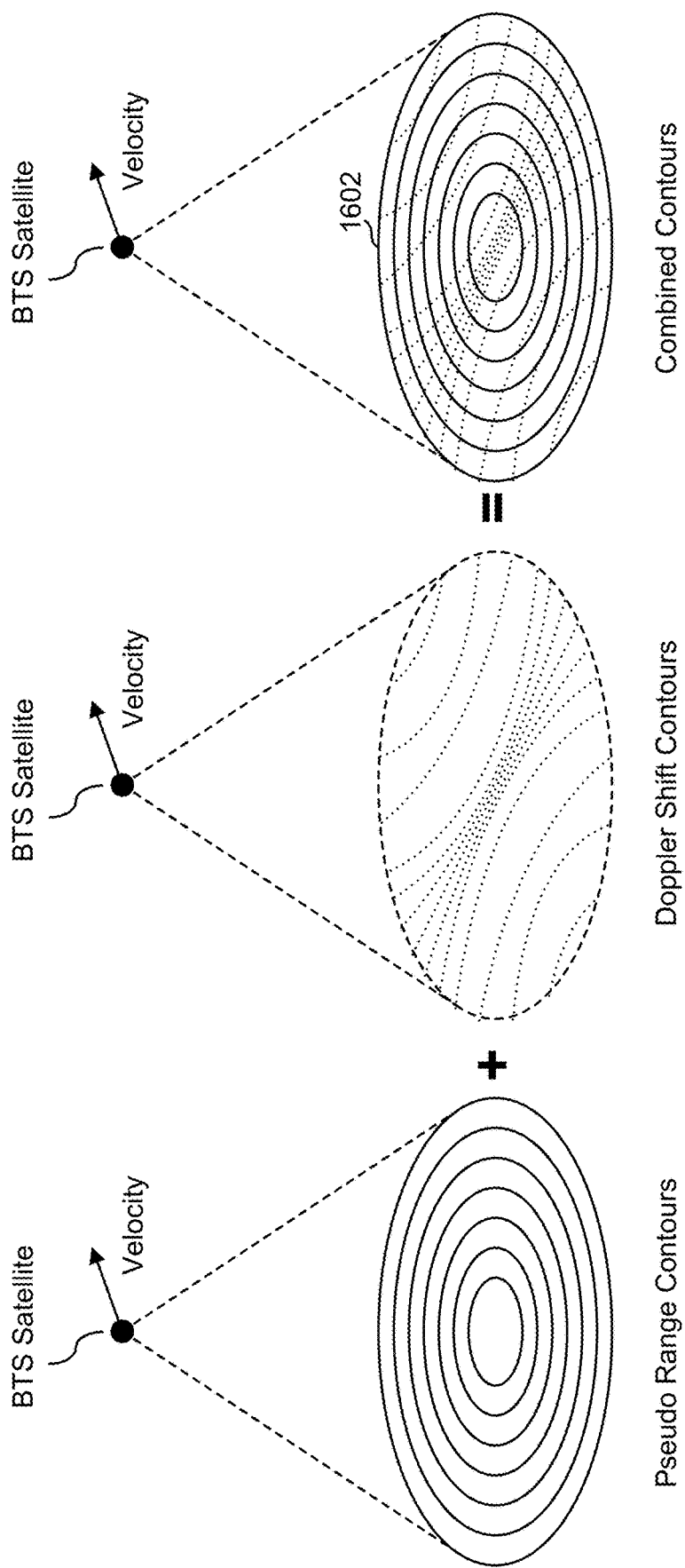
FIG. 13 shows how a satellite footprint might be subdivided into range rings, into Doppler shift strips, and into both range rings and Doppler shift strips.

FIG. 13 shows how a satellite footprint might be subdivided into range rings, into Doppler shift strips, and into both range rings and Doppler shift strips. As illustrated, the ranges of pseudo distances form rings and the Doppler shift contours form strips. Overlaying these into a grid (not necessarily an orthogonal or linear grid), a satellite footprint 1302 is divided into grid cells bounded by a first distance value, a second distance value, a first Doppler shift value and a second Doppler shift value. Each of these grid cells corresponds, therefore, to a combination of a range of pseudo distances and a range of Doppler shifts relative to the on-orbit BTS and is the qualifier for a UE to be assigned a particular channel (or one within a set of particular channels).

Furthermore, the range of pseudo distances and range of Doppler shifts can be divided as well into discrete RF beams from a satellite, which might host multiple antennas, or multiple elements in a single phased array capable of generating a plurality of beams. By dividing sections of the pseudo distances and doppler shift ranges into unique beams where a plurality of beams cover the aggregate satellite field of view, higher throughput and frequency/channel reuse can be achieved.

It should be noted that while the satellite footprint represented here is circular in nature, that is not required. The footprint could be more square or elliptical in shape depending on which antennas are used on the satellite and how they are configured. A non-circular footprint might provide advantages in that it can increase or decrease the spread of propagation delays and/or Doppler shift environments within the footprint. Various antenna technology might be used such single antenna beams, multiple, highly directive antenna beams, large phased arrays capable of beamforming, a large number of antennas, and/or some combination thereof.

This grid represents the combinations of ranges of pseudo distances and ranges of Doppler shifts that correspond to the qualifications for the pseudo distance and Doppler shift channel blocks. The grids cells described above are assumed symmetric about the satellite velocity vector. This means that each grid cell that is off of the centerline of the satellite coverage area has a "twin" grid cell on the opposite side of the satellite footprint. The term "twin" grid cell is used because these two grid cells share a "bucket" that is logically associated with a range of pseudo distances and a range of Doppler shifts (i.e., a UE is logically assigned to a bucket based on whether the UE's pseudo distance is within the range of pseudo distances assigned to that bucket and the UE's Doppler shift is within the range of Doppler shifts assigned to that bucket), since UEs in both of these grid cells operate at similar pseudo distances and Doppler shifts.

Some protocols might be more resilient to Doppler shifts when demodulating a downlink signal, while others might be less so. In some devices, or some protocols, a shift of 2.5 kHz might be the Doppler shift threshold. However, even some low-end cellular telephones might be able to demodulate the BCCH signal with up to a 20 kHz offset from what would typically be that channel's center carrier frequency. This may relate to an interaction between the BTS and the UE on the FCCH (Frequency correction channel), which is another broadcast channel that the UE uses to synchronize its local clock with the BTS. This synchronization is ultimately the information the phone needs to then demodulate the BCCH and other downlink channels. Thus, Doppler shift strips larger than the exemplary 5 kHz strips used in an example above might be used. For example, the buckets might be adjusted and stretched to accommodate larger ranges of Doppler shifts, up to at least 20 kHz in either direction. In effect, this can obviate the need for Doppler shift bucketing when the satellite footprint is small enough that the highest Doppler shift case is less than 20 kHz. This might not be true for other protocols, such as NB-IoT, which use much smaller signal bandwidths. NB-IoT also has other differences, such as the case where the multiple-access protocol is an LTE NB-IoT protocol and the limited distance is 40 km, which would be exceeded by the base-to-mobile distance.

Figure 14:
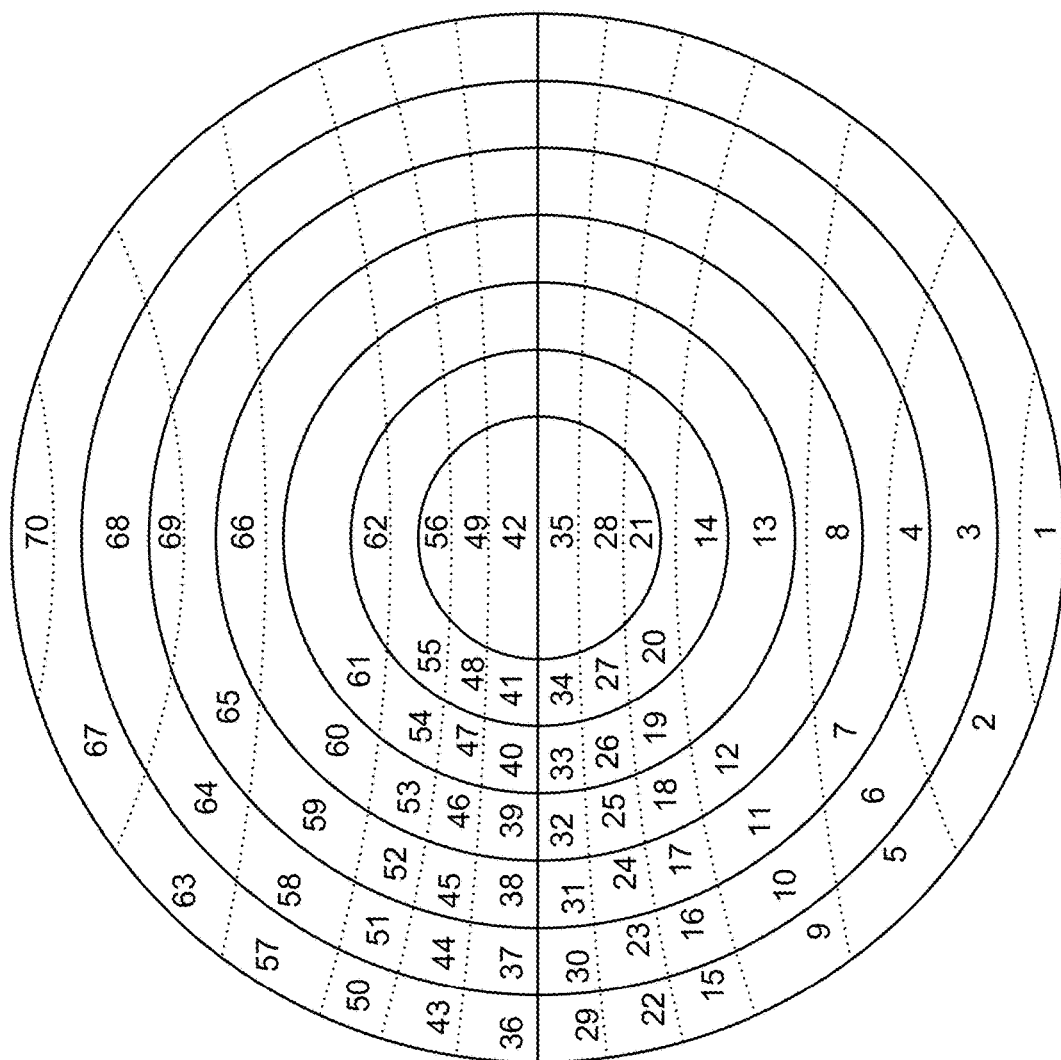
FIG. 14 illustrates an example of range ring/Doppler shift cells of a satellite footprint.

FIG. 14 illustrates one example of range ring/Doppler shift cells of a satellite footprint. The intersection of the pseudo distance rings and the Doppler shift strips form a footprint grid. The grid cells, range ring/Doppler shift cells, can be assigned channels.

FIG. 15 illustrates an example assignment of the range ring/Doppler shift cells of FIG. 14 to particular carrier frequencies and Doppler offset blocks. The logical channel blocks can be associated with one or more carrier frequencies and/or timeslots on the TDMA frames using those carrier frequencies. In FIG. 14, channels are shown with arbitrary channel labels, in this case from 1 to 70. They happen to be in labeled in order from bottom to top, i.e., from most negative Doppler shift to most positive Doppler shift. The channels 1 to 70 might correspond to channels assigned to each of eight timeslots in frames that use eight carrier frequencies and six timeslots in a frame for one more carrier frequency.

The diagram of FIG. 14 shows how the grid cells of the satellite footprint are assigned channel numbers. Only the left side of the footprint is shown numbered, but it should be understood that the twin cells on the right are also assigned to those channel numbers. The channel allocation table in FIG. 15 illustrates a channel allocation scheme in which each channel number is associated with, allocated, or assigned a Doppler offset block corresponding to a Doppler shift strip (from $D_0$ to $D_{13}$) and a channel block (from $b_0$ to $b_6$). Note that in other embodiments, the number of channels might change with the decision for how to "bucket" pseudo distances and Doppler shifts for UEs. Multiple channels can be assigned to a grid cell. In the example of FIGS. 14 and 15, one channel number is assigned per grid cell for simplicity. Only half of the grid cell is filled out with channel assignments because it is symmetric about the satellite velocity vector. The grid cells that are not filled in, in an actual implementation, are assigned the same channel number in the grid cell on the opposite side relative to it in the contour map. This is because although the symmetric grid cells exist in different physical locations on the contour map (and in the real world), they represent the same qualification parameters in terms of pseudo distance from the on-orbit BTS and Doppler shift.

The table in FIG. 15 is the channel assignment matrix that the on-orbit BTS would use to determine how to assign channels to a UE and would assign them in a manner where adjacent numbers are assigned adjacent carrier frequencies. When a signal burst is received on the RACH, the calculated Doppler shift and calculated pseudo distance estimates are used to determine which channel should be assigned to that UE by finding the appropriate grid cell and looking up the channel number for the UE from the table. In this example, not every channel block (the columns in FIG. 15) has the same number of actual channels in use or available because not every channel block corresponds to pseudo distances that could experience a full range of Doppler shift. The BTS stores a copy of this table and might have different versions of this table, for use when assigning a channel number based on grid cell.

Figure 16:
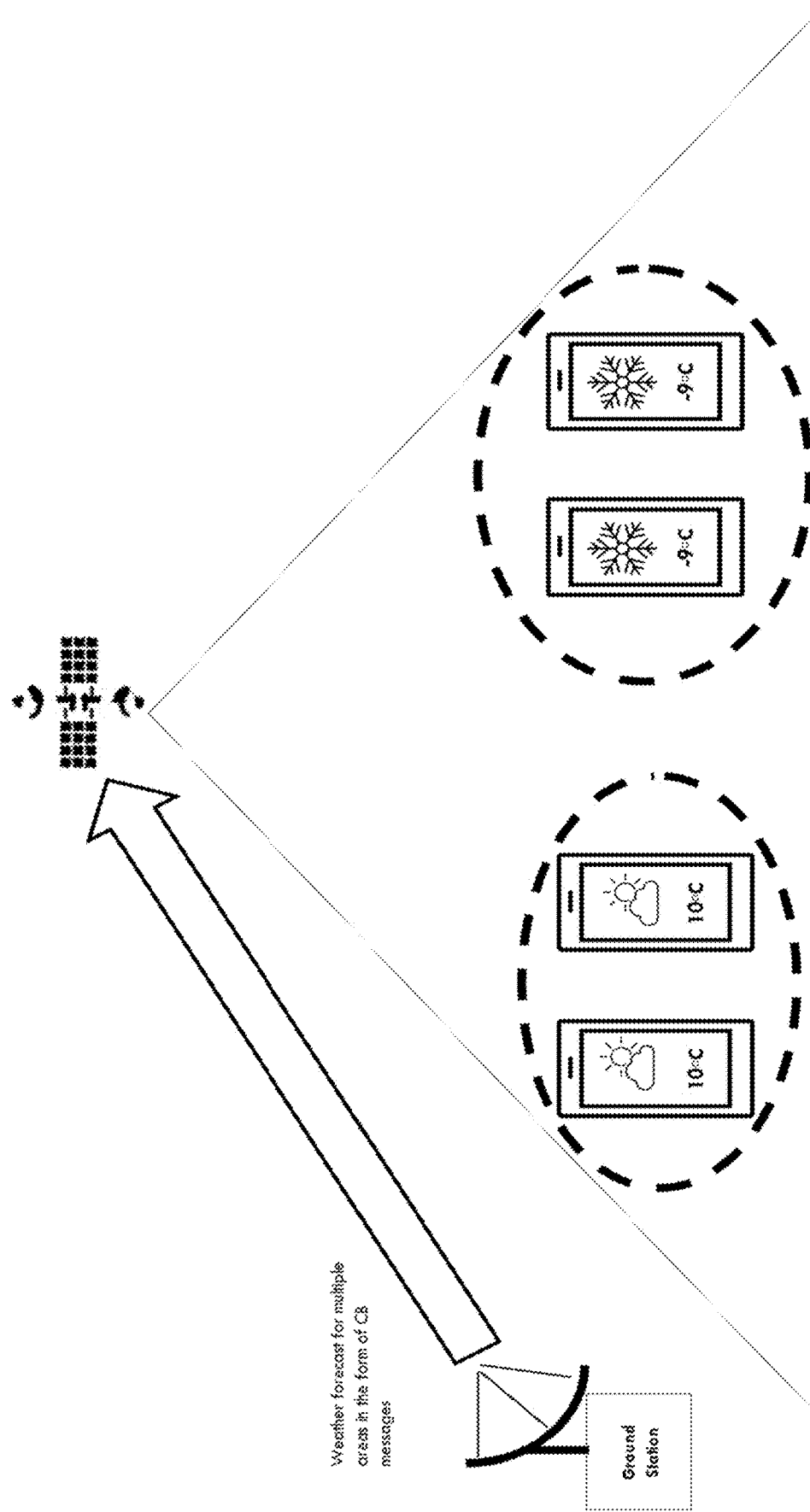
FIG. 16 illustrates an example of selective messaging based on geographic location, according to an embodiment.

FIG. 16 illustrates an example of selective messaging based on geographic location, according to an embodiment, in this example sending weather forecasts to geotargeted UEs. An orbital base station might broadcast informational content via the use of the Cell Broadcast (CB) [3GPP TS 23.041] protocol. A CB envelope processor will note the incoming CB after receipt by the UE, check the message identifier to determine if the CB is a TCBM that it should process, determine the relevant apps from the logical ID, and send the TCBM payload to the appropriate app to handle the TCBM payload.

Smartphone operating systems allow for a subset of communication APIs to be commonly available to all third party developed applications. Whereas some communication APIs are deemed to be only available on a privileged basis to specific developers and applications, this is typically determined by the OS provider and/or the UE OEM. Although CB was originally intended as a generic broadcast mechanism, it has predominantly been used for emergency notifications, consequently the CB API is typically only accessible via this privileged mode access.

In those cases, in order for an application on a UE to get access to CBs originating from the mobile network a variety of solutions might be implemented including the development of a SAT application such as a CB envelope processor, on the UE's resident SIM. As a SAT application on the SIM is deemed a secure application it can operate as an effective privilege mode application. The SAT application can register with the UE to receive notification of any incoming CB events it receives.

When the SAT application receives notification of a CB, it can request the CB message to be provided to the SAT application on the SIM. Upon fetching the CB message, the SAT application can then determine from CB header information if the CB is intended for use by any apps installed on the UE. The SAT application can then strip out the CB payload (message informational content), carry out any precursory decoding and verification and then push the content up to the UE via a set of defined proactive commands (3GPP in TS 11.14 and TS 31.111), so the content can be made available to the relevant application via existing open APIs and notification methods to the registered app, which can then process and present the information to a user via the app's user interface.

The SAT application runtime environment might also provide a basic text and menu driven user interface for the UE, so in instances where the UE OS does not provide support for third party applications, the CB content would be displayed to the user by extending the SAT application to provide a relevant user interface (UI).

Figure 17:
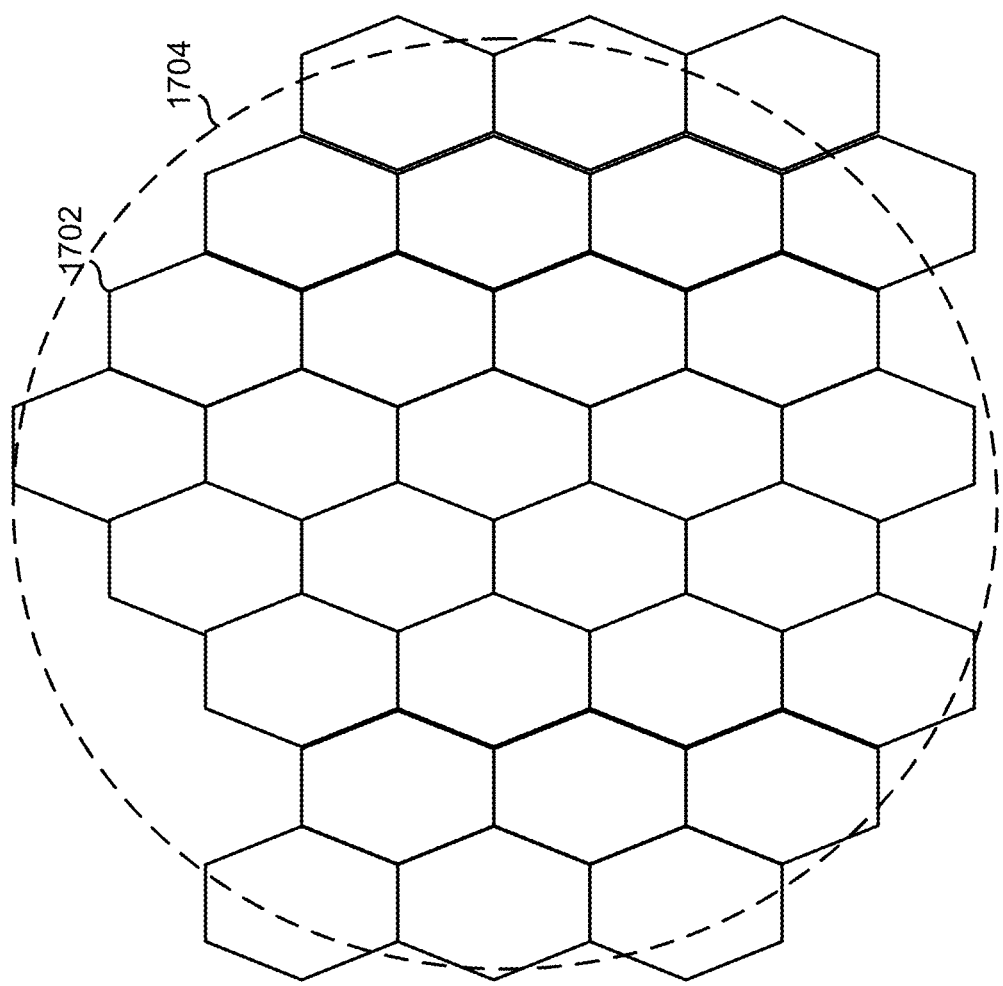
FIG. 17 illustrates sending a TCBM using a single CB message packet, according to an embodiment.

FIG. 17 illustrates sending a TCBM using a single CB message packet, according to an embodiment. As illustrated there, geotargeted CB messages sent over an orbital base station's footprint 1702 covering a plurality 1702 of polygons using a single CB message can reach all user devices located anywhere within a specific polygon.

Figure 18:
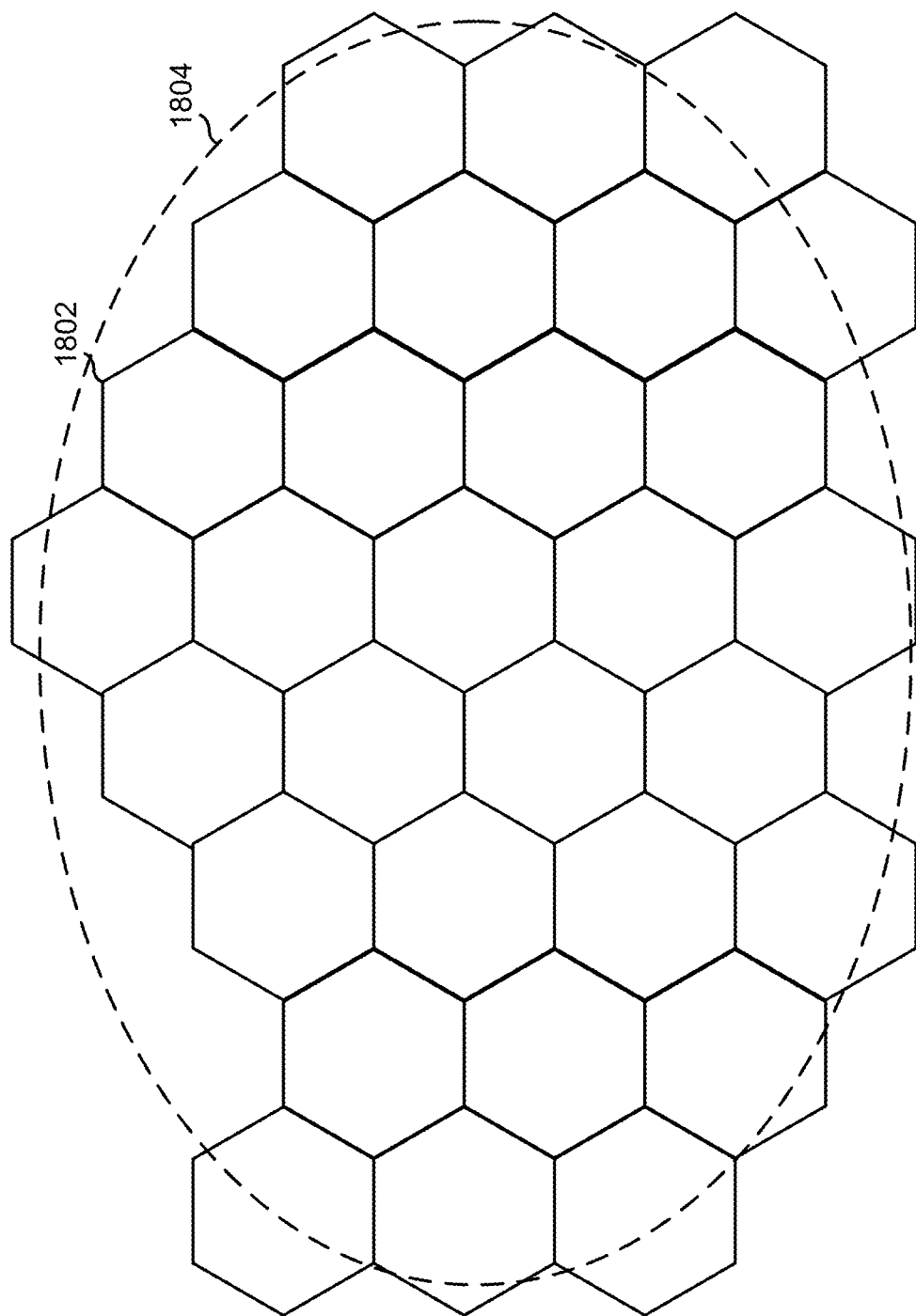
FIG. 18 illustrates sending a TCBM using multiple CB message packets, according to an embodiment.

FIG. 18 illustrates sending a TCBM using multiple CB message packets, according to an embodiment. Geotargeted CB messages concatenated over two or more CB messages can reach larger polygons.

Figure 19:
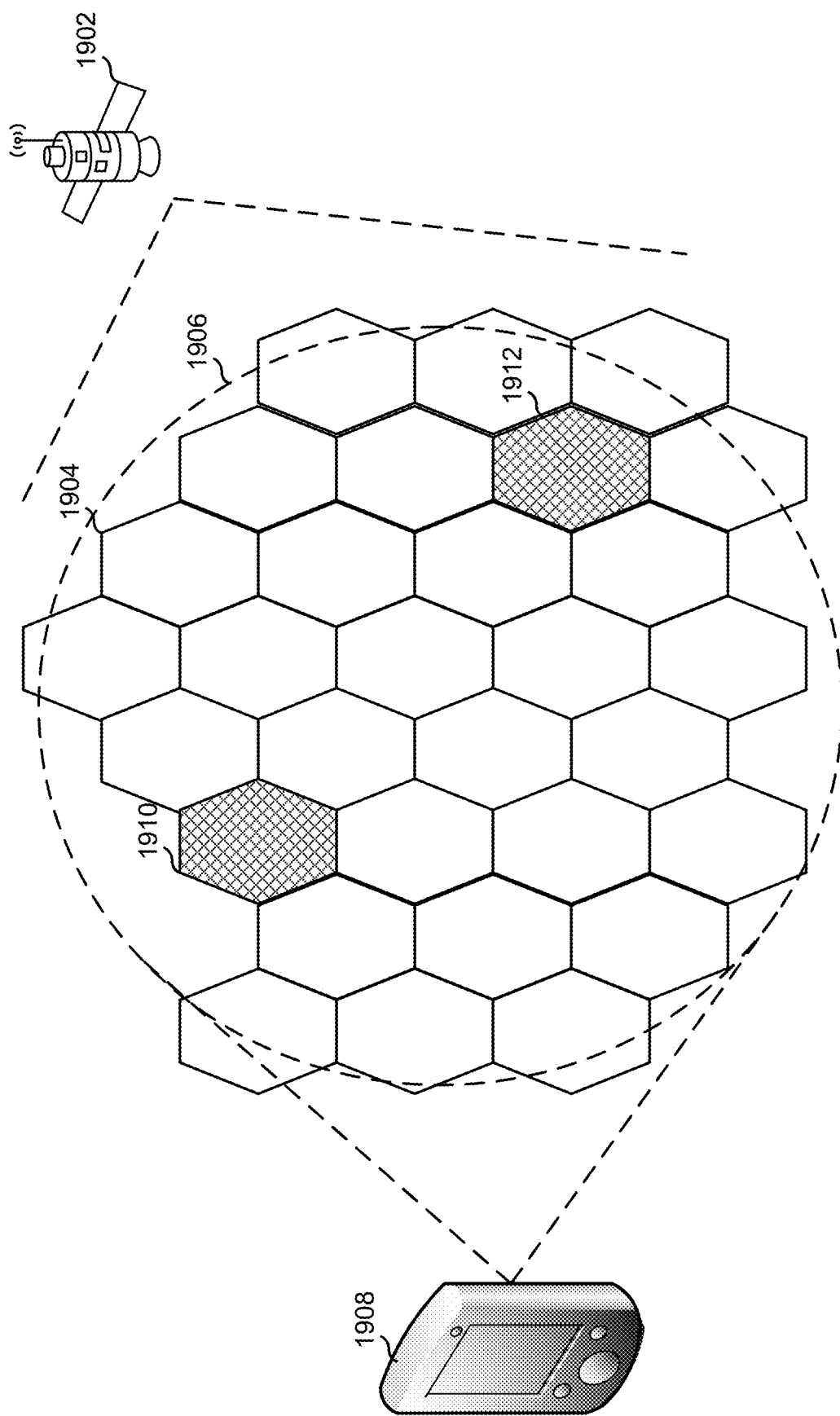
FIG. 19 illustrates a UE obtaining multiple TCBMs targeted to different cells, according to an embodiment.

FIG. 19 illustrates a UE obtaining multiple TCBMs targeted to different cells, according to an embodiment. As illustrated, the UE has the ability to receive multiple geo-targeted CB messages within a specific spotbeam.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. Example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. An electronic user device comprising:
   inclusion list storage, comprising electronically readable memory, for storing an inclusion list, the inclusion list indicating included logical IDs;
   a security module app, operating in a privileged mode;
   a data stream processor, operating in a nonprivileged mode, the data stream processor configured to accept call-back hooks from the security module app, to provide event notices to the security module app indicating cellular broadcast reception events, and to respond to cellular broadcast message detail requests received from the security module app with cellular broadcast message details;
   a cellular broadcast envelope processor, as part of the security module app, configured to process a cellular broadcast message that was received and noticed by the data stream processor to the security module app, wherein the cellular broadcast message is a message that includes a payload comprising a targeted cellular broadcast message and a logical ID associated with the targeted cellular broadcast message, and wherein the cellular broadcast envelope processor processes the targeted cellular broadcast message based on whether the logical ID associated with the targeted cellular broadcast message is on the inclusion list.

2. The electronic user device of claim 1, further comprising a TCP/IP stack, wherein the cellular broadcast message is received by the security module app operating in the privileged mode directly from the data stream processor before receipt and filtering of cellular broadcast messages by the TCP/IP stack.

3. The electronic user device of claim 1, wherein the security module app is on a SIM card and the electronic user device further comprises a filtering module for reading the inclusion list stored in the inclusion list storage.

4. The electronic user device of claim 1, wherein the cellular broadcast message is sent via a satellite, and wherein the cellular broadcast message comprises signal parameters that cause a non-targeted user device to perceive the cellular broadcast message as noise.

5. The electronic user device of claim 4, wherein the signal parameters comprise one or more of Doppler shifts and/or signal delays.

6. The electronic user device of claim 1, further comprising:
- a location module for indicating a geographic location of the electronic user device;
- a filtering module for reading the inclusion list stored in the inclusion list storage, wherein the logical ID is associated with an ID geographic location and wherein the filtering module is configured to process the cellular broadcast message, compare the geographic location of the electronic user device with the ID geographic location of the cellular broadcast message to form a comparison and, based on the comparison, further process the cellular broadcast message or drop the cellular broadcast message.

7. The electronic user device of claim 1, wherein the cellular broadcast message is one of a plurality of cellular broadcast messages received over a plurality of broadcast channels simultaneously.

8. The electronic user device of claim 1, wherein the security module app is configured to format the targeted cellular broadcast message for consumption by an electronic user device app, operating in the nonprivileged mode, that receives data via a data channel when the data channel is available.

9. The electronic user device of claim 1, wherein the electronic user device is configured to communicate using a telecommunications protocol to receive the cellular broadcast message, wherein the telecommunications protocol comprises at least one of 3GPP, GSM, CDMA, LTE, 2G, 3G, 4G, 5G, and/or WEA3.0.

10. The electronic user device of claim 9, wherein the telecommunications protocol comprises WEA3.0 and wherein the cellular broadcast message is a geo-targeted cellular broadcast message.

11. A non-transitory computer-readable storage medium storing instructions, which when executed by an electronic user device, causes the electronic user device to carry out operations comprising:
- storing an inclusion list in an inclusion list storage, wherein the inclusion list storage comprises electronically readable memory, and wherein the inclusion list comprises included logical IDs;
- issuing a call-back hook from a security module app operating in a privileged mode;
- accepting the call-back hook by a data stream processor operating in a nonprivileged mode;
- providing an event notice from the data stream processor to the security module app, according to the call-back hook when a cellular broadcast message is received;
- responding, from the data stream processor, to cellular broadcast message detail requests received from the security module app; and
- processing the cellular broadcast message with a cellular broadcast envelope processor, wherein the cellular broadcast message is a message that includes a payload comprising a targeted cellular broadcast message and a logical ID associated with the targeted cellular broadcast message, wherein the cellular broadcast envelope processor processes the targeted cellular broadcast message based on whether the logical ID associated with the targeted cellular broadcast message is on the inclusion list.

12. The non-transitory computer-readable storage medium of claim 11, the operations further comprising formatting the targeted cellular broadcast message for consumption by an electronic user device app operating in the nonprivileged mode, wherein the electronic user device app is an app that receives data via a data channel when the data channel is available.

13. The non-transitory computer-readable storage medium of claim 11, wherein the cellular broadcast message is received by the security module app operating in the privileged mode directly from the data stream processor before receipt and filtering of cellular broadcast messages by a TCP/IP stack.

14. The non-transitory computer-readable storage medium of claim 11, the operations further comprising:
- using a location module, determining a geographic location of the electronic user device;
- reading the inclusion list stored in the inclusion list storage, wherein the logical ID is associated with an ID geographic location;
- processing the cellular broadcast message to compare the geographic location of the electronic user device with the ID geographic location of the cellular broadcast message to form a comparison; and
- based on the comparison, further processing the cellular broadcast message or dropping the cellular broadcast message.

15. The non-transitory computer-readable storage medium of claim 11, wherein the cellular broadcast message is one of a plurality of cellular broadcast messages received over a plurality of broadcast channels simultaneously, the operations further comprising processing the plurality of cellular broadcast messages.

16. The non-transitory computer-readable storage medium of claim 11, wherein the electronic user device is configured to communicate using a telecommunications protocol to receive the cellular broadcast message, wherein the telecommunications protocol comprises at least one of 3GPP, GSM, CDMA, LTE, 2G, 3G, 4G, 5G, and/or WEA3.0.

17. The non-transitory computer-readable storage medium of claim 16, wherein the telecommunications protocol comprises WEA3.0 and wherein the cellular broadcast message is a geo-targeted cellular broadcast message.

18. The non-transitory computer-readable storage medium of claim 11, the operations further comprising formatting the targeted cellular broadcast message for consumption by an electronic user device app, operating in the nonprivileged mode, that receives data via a data channel when the data channel is available.

19. A method performed by an electronic user device comprising:
- storing an inclusion list in an inclusion list storage, wherein the inclusion list storage comprises electronically readable memory, and wherein the inclusion list comprises included logical IDs;
- issuing a call-back hook from a security module app operating in a privileged mode;
- accepting the call-back hook by a data stream processor operating in a nonprivileged mode;
- providing an event notice from the data stream processor to the security module app, according to the call-back hook when a cellular broadcast message is received;
- responding, from the data stream processor, to cellular broadcast message detail requests received from the security module app; and
- processing the cellular broadcast message with a cellular broadcast envelope processor, wherein the cellular broadcast message is a message that includes a payload comprising a targeted cellular broadcast message and a logical ID associated with the targeted cellular broadcast message, wherein the cellular broadcast envelope processor processes the targeted cellular broadcast message based on whether the logical ID associated with the targeted cellular broadcast message is on the inclusion list.

20. The method of claim 19, further comprising formatting the targeted cellular broadcast message for consumption by an electronic user device app operating in the nonprivileged mode, wherein the electronic user device app is an app that receives data via a data channel when the data channel is available.

21. The method of claim 19, wherein the cellular broadcast message is received by the security module app operating in the privileged mode directly from the data stream processor before receipt and filtering of cellular broadcast messages by a TCP/IP stack.

22. The method of claim 19, further comprising:
using a location module, determining a geographic location of the electronic user device;
reading the inclusion list stored in the inclusion list storage, wherein the logical ID is associated with an ID geographic location;
processing the cellular broadcast message to compare the geographic location of the electronic user device with the ID geographic location of the cellular broadcast message to form a comparison; and
based on the comparison, further processing the cellular broadcast message or dropping the cellular broadcast message.

23. The method of claim 19, wherein the cellular broadcast message is one of a plurality of cellular broadcast messages received over a plurality of broadcast channels simultaneously, the method further comprising processing the plurality of cellular broadcast messages.

24. The method of claim 19, further comprising formatting the targeted cellular broadcast message for consumption by an electronic user device app, operating in the nonprivileged mode, that receives data via a data channel when the data channel is available.

25. The method of claim 19, wherein the electronic user device is configured to communicate using a telecommunications protocol to receive the cellular broadcast message, wherein the telecommunications protocol comprises at least one of 3GPP, GSM, CDMA, LTE, 2G, 3G, 4G, 5G, and/or WEA3.0.

26. The method of claim 25, wherein the telecommunications protocol comprises WEA3.0 and wherein the cellular broadcast message is a geo-targeted cellular broadcast message.

* * * * *